United States Patent
Khasis

(10) Patent No.: US 10,655,973 B2
(45) Date of Patent: *May 19, 2020

(54) DETECTING ROUTE DEVIATIONS WITH BUFFER STRIPS FOR AUTONOMOUS AND TRADITIONAL FLEETS

(71) Applicant: Route4Me, Inc., Fort Lee, NJ (US)

(72) Inventor: Dan Khasis, Fort Lee, NJ (US)

(73) Assignee: Route4Me, Inc., Fort Lee, NJ (US)

( * ) Notice: Subject to any disclaimer, the term of this patent is extended or adjusted under 35 U.S.C. 154(b) by 63 days.

This patent is subject to a terminal disclaimer.

(21) Appl. No.: 15/917,850

(22) Filed: Mar. 12, 2018

(65) Prior Publication Data

US 2018/0259347 A1 Sep. 13, 2018

Related U.S. Application Data

(63) Continuation of application No. 15/673,394, filed on Aug. 9, 2017, now Pat. No. 9,952,056, which is a (Continued)

(51) Int. Cl.
*G01C 21/34* (2006.01)
*G06Q 10/04* (2012.01)
(Continued)

(52) U.S. Cl.
CPC ....... *G01C 21/3415* (2013.01); *G06Q 10/047* (2013.01); *G06Q 10/063114* (2013.01);
(Continued)

(58) Field of Classification Search
CPC ......... B60W 50/0098; B60W 2510/06; B60W 2510/30; G05D 1/0274; G05D 1/0088;
(Continued)

(56) References Cited

U.S. PATENT DOCUMENTS

| 5,958,012 A | 9/1999 | Battat |
| 6,256,577 B1 | 7/2001 | Graunke |

(Continued)

OTHER PUBLICATIONS

Augus Loten, MIT Team Uses Big Data, IoT to Speed Up 'Last Mile' Deliveries, CIO Journal, Mar. 23, 2016.

*Primary Examiner* — Rodney A Butler
(74) *Attorney, Agent, or Firm* — Ricky Lam

(57) ABSTRACT

Systems and methods for geocoding coordinates of users, vehicles and destinations on a map, and to identify when a transit vehicle deviates from a system generated driving route are disclosed. As the transit vehicle travels along the route, its actual path of travel may be compared to an optimal driving route generated by the system to obtain route deviation data. The route deviation data and/or road network data may be filtered to remove data noise and further analyzed to build a profile of a driver operating a transit vehicle. A digital signature identifying at least one pattern of behavior and/or operating characteristic associated with a specific driver operating a vehicle is further developed, and may be used to allow a system administrator of a vehicle fleet to filter out, or filter for, specific driver types based on driving behaviors that may be suitable for a particular operation.

5 Claims, 24 Drawing Sheets

Related U.S. Application Data continuation-in-part of application No. 15/599,426, filed on May 18, 2017, now Pat. No. 9,792,567, and a continuation-in-part of application No. 15/456,521, filed on Mar. 11, 2017, now Pat. No. 9,792,575.

(60) Provisional application No. 62/372,313, filed on Aug. 9, 2016, provisional application No. 62/436,449, filed on Dec. 20, 2016, provisional application No. 62/338,487, filed on May 18, 2016, provisional application No. 62/307,402, filed on Mar. 11, 2016.

(51) Int. Cl.
| | |
|---|---|
| *G07C 5/02* | (2006.01) |
| *G06Q 10/06* | (2012.01) |
| *G06Q 10/10* | (2012.01) |
| *G08G 1/00* | (2006.01) |
| *G06Q 10/08* | (2012.01) |

(52) U.S. Cl.
CPC ........... *G06Q 10/1097* (2013.01); *G07C 5/02* (2013.01); *G08G 1/20* (2013.01); *G08G 1/207* (2013.01); *G06Q 10/08355* (2013.01)

(58) Field of Classification Search
CPC ........ G05D 2201/0213; G01C 21/3453; G07C 5/0825; G07C 5/0808
See application file for complete search history.

(56) References Cited

U.S. PATENT DOCUMENTS

| | | |
|---|---|---|
| 8,275,508 B1 | 9/2012 | Adams |
| 8,374,781 B2 | 2/2013 | Hartman |
| 8,825,395 B2 | 9/2014 | Boss |
| 8,977,481 B1 | 3/2015 | Downs |
| 9,140,567 B2 | 9/2015 | Fryer |
| 2004/0030572 A1 | 2/2004 | Campbell |
| 2006/0031007 A1* | 2/2006 | Agnew .............. G01C 21/3492 701/423 |
| 2007/0155404 A1 | 7/2007 | Yamane |
| 2009/0125229 A1* | 5/2009 | Peri .......... G01C 21/32 701/533 |
| 2009/0276153 A1 | 11/2009 | Lee |
| 2010/0205022 A1 | 8/2010 | Brown |
| 2010/0312466 A1 | 12/2010 | Katzer |
| 2010/0332121 A1 | 12/2010 | Okude |
| 2012/0194681 A1* | 8/2012 | Atsnnon ............ G01C 21/3602 348/149 |
| 2013/0218463 A1* | 8/2013 | Howard ............. G01C 21/3682 701/533 |
| 2014/0095309 A1 | 4/2014 | Macneille |
| 2015/0032366 A1 | 1/2015 | Man |
| 2015/0241225 A1* | 8/2015 | Liu .................... G01C 21/3682 701/540 |
| 2016/0117871 A1 | 4/2016 | Mcclellan |
| 2016/0187138 A1* | 6/2016 | Chakraborty .......... G01C 21/20 701/491 |
| 2016/0379168 A1 | 12/2016 | Foerster |

\* cited by examiner

```
┌─────────────────────────────────────────┐
│  Overlaying one or more buffer strips on top of a │
│           generated route              │
│                1210                    │
└─────────────────────────────────────────┘
                    │
                    ▼
┌─────────────────────────────────────────┐
│ Positioning the buffer strips perpendicular to the │
│           generated route              │
│                1220                    │
└─────────────────────────────────────────┘
```

FIG. 12

Differentiating a plurality of drivers based on a characteristic match
1910

Filtering for a driver based on the characteristic match
1920

FIG. 19

DETECTING ROUTE DEVIATIONS WITH BUFFER STRIPS FOR AUTONOMOUS AND TRADITIONAL FLEETS

CLAIMS OF PRIORITY

This patent application is a continuation-in-part and claims priority from:
(1) U.S. utility patent application Ser. No. 15/456,521, entitled 'Complex dynamic route sequencing for multi-vehicle fleets using traffic and real-world constraints' filed on Mar. 11, 2017, which claims benefit of U.S. provisional patent application No. 62/307,402, entitled 'Complex dynamic route sequencing for multi-vehicle fleets using traffic and real-world constraints', filed Mar. 11, 2016.
(2) U.S. utility patent application Ser. No. 15/599,426, entitled 'Methods and systems for managing large asset fleets through a virtual reality interface', filed on May 18, 2017, which claims benefit of U.S. provisional patent application No. 62/338,487, entitled 'Method and system for managing large vehicle fleets through a virtual reality environment', filed May 18, 2016.
(3) U.S. provisional patent application No. 62/372,313, entitled 'Methods and systems for detecting and verifying route deviations', filed Aug. 9, 2016.
(4) U.S. provisional patent application No. 62/436,449, entitled 'Autonomous supply and distribution chain', filed Dec. 20, 2016.

FIELD OF TECHNOLOGY

This disclosure relates generally to techniques for assessing traffic-related data, such as by filtering traffic data, and detecting and verifying route deviations.

BACKGROUND

In fleet management, the use of a global positioning system (GPS) to plan travel routes is a common method to reduce fuel costs, optimize labor budget, and improve operational efficiencies. However, even the best-planned routes are not always followed. There are a number of reasons why a driver deviates from a planned optimal route. A driver may re-route to a customer with more urgent needs, to accommodate unexpected construction roadwork and traffic congestion, to avoid a weather condition, and/or to refuel the vehicle. A driver may also reroute to make an unauthorized stop for personal reasons. When a vehicle travels off the planned route, the GPS mounted on the vehicle detects an off-route deviation which prompts the GPS to calculate a restoration route from the vehicle's current position back to either the original optimal route or a new optimal route, and display new navigational information to guide the vehicle thereto. The route deviation detection here is basic, and may only be used as a trigger for the purposes of recalculating travel routes. Other benefits that route deviation data can provide are not yet realized.

Route deviation data obtained by comparing a vehicle's actual travel route to a planned one provides several benefits. First, it improves driver accountability. Although drivers can be honest and trustworthy, operation management may have to deal with occasional "bad apples." When drivers know their actual routes are being analyzed, they may be more inclined to stick to the planned route, which means more savings on both labor and fuel, and allows for more efficient service for customers. Second, it may be able to identify better routes which can be used to generate optimal routes for future travels. Although GPS technology can quickly create optimized routes for all of the required stops, it may not come with local knowledge. For example, if a driver has routinely made a deviation from a planned route, the driver may likely know of an alternative route that the GPS does not. The driver is perhaps avoiding train tracks, a particularly congested intersection, or an unsafe part of town. Finally, it helps in fleet management. By being up-front about the GPS tracking with the drivers, management and drivers align their expectations of staying on the planned routes. If there is ever a dispute with a driver, management can solve it quickly by referring to the tracking data before the issue escalates. Collected route deviation data may also be used as training material for new drivers, or as a guide to conduct drivers' performance evaluations.

Further, current systems may contain flaws that may limit accurate analyzation of tracked route data. For example, a GPS can be interchangeable with different vehicles, and therefore if a driver shares their vehicle and/or GPS with another driver, it may be difficult for a system administrator to determine the true identity of a driver of a tracked route. In addition, roadways and geographies can sometime mirror in pattern and distance. It may be difficult for legacy systems to verify with satisfactory accuracy that a traveled route is directed to a system generated route.

Thus, there is a need for a navigation tracking system that is capable of detecting and validating tracked route data. The data can be further analyzed to retrieve important information that can be used to improve fleet management and to incorporate feedback into optimal route planning.

SUMMARY

In one aspect, the present invention discloses a system and a method for geocoding coordinates of users, vehicles and destinations on a map. Geocoding may be a process of using the description of a location, e.g., a destination address, to reveal the latitude and longitude coordinates of that location. Users and vehicles (and non-fixed destinations) of the system may be tracked through the geocoding of their mobile devices, such as a smartphone or portable computer. Tracking may be defined as the action of persistent storing or using signals that are transmitted to GPS devices or received by a device from location emitting sensors, e.g., cellular towers, NFC near field communication devices, BLE Bluetooth low energy device, iBeacon technology, to determine the location, speed and direction of a user and/or vehicle in real time. The system may also allow for reverse geocoding, which may be a process of back (reverse) coding of coordinates to a readable destination description, e.g., the destination address.

In another aspect, the present invention discloses a system and a method to identify when a transit vehicle deviates from one or more system generated driving routes. The generated routes may comprise a primary route and a plurality of alternate routes. The alternate routes may be prioritized based on total distance, total time, or total cost based on an objective cost function to complete each route. A mobile device of a user or vehicle may be configured to generate positioning data indicative of its location. One or more suggested or optimized routes may be calculated and identified by the system to guide a driver of the vehicle to one or more destinations. The vehicle may also be a self-driving or an autonomous vehicle. As the transit vehicle travels along a generated route, its actual path of travel may be compared to the generated routes.

In yet another aspect, the present invention discloses a system and a method to filter and analyze route deviation data and road network data when a transit vehicle deviates from one or more system generated driving routes. The generated routes may comprise a primary route and a plurality of alternate routes. The alternate routes may be prioritized based on total distance, total time, or total cost based on an objective cost function to complete each route. The system may further analyze the route deviation data and/or road network data to build a driver or vehicle profile. The mobile device of the driver or vehicle is configured to generate positioning data indicative of its location. One or more suggested or optimized route may be calculated and identified by the system to guide the driver of the vehicle to one or more destinations. Road network data, including traffic flow information and traffic incident information, obtained through a traffic management platform such as described in U.S. patent application Ser. No. 15/456,521, entitled, "Complex dynamic route sequencing for multi-vehicle fleets using traffic and real-world constraints", with a filing date on Mar. 11, 2017, and which is incorporated herein by reference in its entirety for all purposes, may be used to generate the optimized routes.

In yet another aspect, the present invention discloses a system and a method to build a persona or profile of a driver of a transit vehicle. Road network data, e.g., traffic data, combined with route deviation data, e.g., GPS data, may be used to display a graphical indication of one or more system generated routes and a tracked route of a vehicle to determine whether, how, and how much, the vehicle has deviated from a generated route. By comparing a generated route to the tracked route, a driver profile may be built to determine the value of the driver to the fleet or operation. For example, the system and method may analyze historical tracked data of a driver to determine certain tendencies that are specific to the driver. The system may be able to differentiate whether the tracked route, e.g., a deviated route, the driver took was an alternative that provided positive value to the operation and/or fleet of the vehicle, or that it provided negative value to the operation and/or fleet.

In yet another aspect, a system and a method for developing a digital signature identifying a specific driver operating a vehicle uses internal and external sensors of a mobile device belonging to the driver. The development of the digital signature and subsequent identification of the driver may be performed by collecting data regarding vehicle operations, analyzing the data to identify at least one pattern of behavior and/or operating characteristic associated with the driver, and developing a digital signature for the driver. Digital signatures for a plurality of drivers may be developed and stored by a storing means, e.g., a memory coupled to a processor, and may be used for comparison of the drivers. In addition, data from the sensors of the mobile device and vehicle-integrated sensors, such as an on-board diagnostic sensor, connected to a network may be combined to provide more accurate calculations and determinations as to the identity of a driver operating a vehicle at any given time interval. Driver identification may be used to allow a system administrator of a vehicle fleet to filter out or filter for specific driver types based on driving behaviors that may be suitable for a particular operation. For example, a driver may be authorized to operate heavy equipment, e.g., large transport trucks, and may comprise a digital signature corresponding to validation to operate the vehicle and is preferred over drivers with an unsuitable digital signature, e.g., erratic drivers.

In yet another aspect, the present invention discloses a system and a method for capturing an image of a vehicle's surrounding to verify the vehicle's location based on the image. A geography image may be captured and authenticated by a data processing system to confirm the location of a driver or vehicle that has deviated from one or more generated routes, or to confirm that the driver or vehicle is maintaining paths of the generated routes. One or more cameras may be mounted within the interior of the vehicle, e.g., dashboard, and/or may be mounted on the exterior of the vehicle, e.g., hood or body. In some embodiments, the camera may be configured to move along one or more linear guides. The movement of the camera may allow wider scanning of a visual field of a particular area of interest.

In yet another aspect, the present invention discloses a system and a method for collecting ambient soundwaves of a vehicle's surrounding to verify the vehicle's location based on the soundwaves. Ambient sounds such as from birds chirping, wind blowing, human vocal chattering, and leaves and branches swinging, may be captured and authenticated by a data processing system to confirm the location of a driver or vehicle that has deviated from one or more generated routes, or to confirm that the driver or vehicle is maintaining paths of the generated routes. One or more microphones of a mobile device belonging to the driver and/or of the vehicle may be used to capture the soundwaves. The microphone may be a device that converts soundwaves into an electrical signal, and may be used to detect wave patterns and measure sound levels of an environment of the driver's vehicle. A sound or speech processing unit may process the received sound data to analyze the wave patterns, such as recognition of a driver's speech patterns and/or ambient sounds belonging to a frequently visited destination of the driver. The data may then be matched with previously recorded and stored soundwaves to determine or confirm whether the driver has deviated from a system generated route.

BRIEF DESCRIPTION OF THE DRAWINGS

Example embodiments are illustrated by way of example and are not limited to the figures of the accompanying drawings, in which, like references indicate similar elements.

FIG. 12 is a flowchart of a method for generating a pair of buffer perimeter on a generated route using buffer strips, according to at least one embodiment.

FIG. 19 is a flowchart of a method for filtering drivers for an operation of a vehicle fleet, according to at least one embodiment.

DETAILED DESCRIPTION

Figure 1:
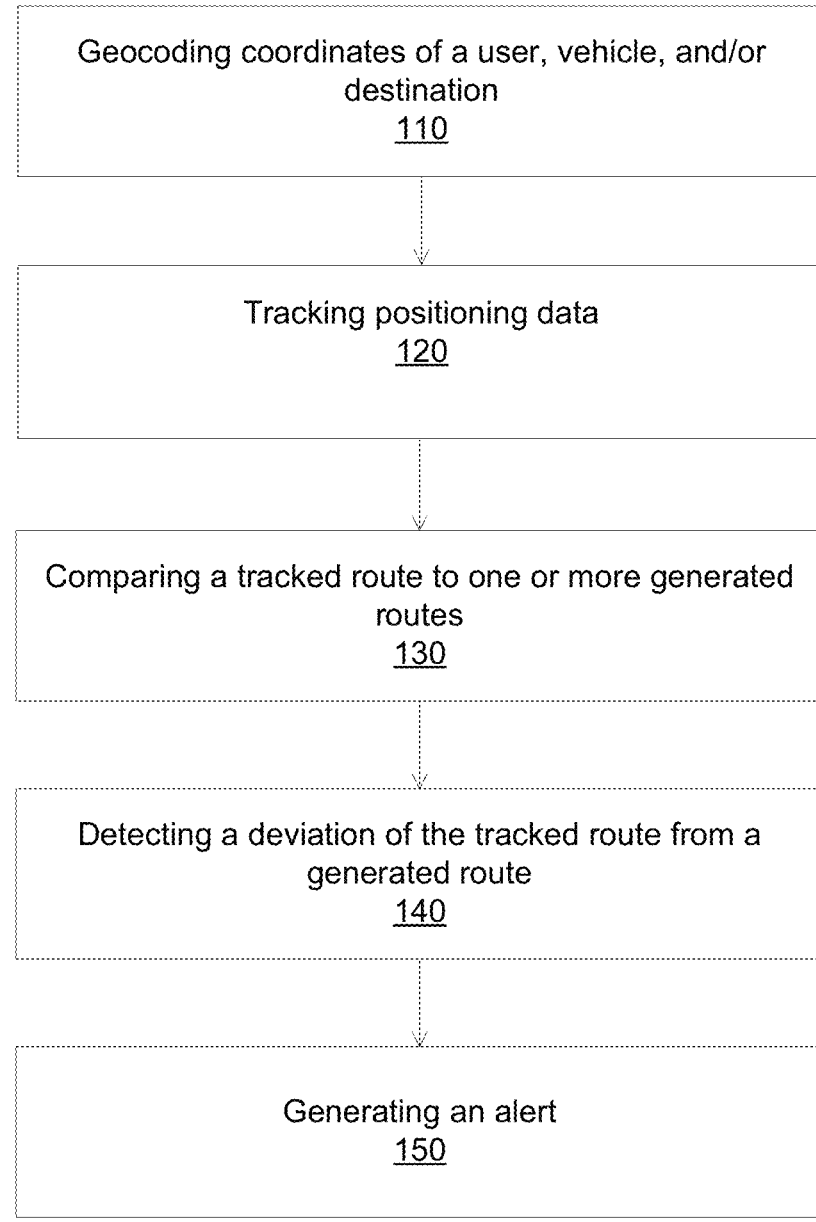
FIG. 1 is a flowchart of a method for detecting a route deviation, according to at least one embodiment.

Disclosed are systems and methods for assessing traffic-related data, such as by filtering traffic data, and detecting and verifying route deviations. Although the present embodiments have been described with reference to specific example embodiments, it will be evident that various modifications and changes may be made to these embodiments without departing from the broader spirit and scope of the various embodiments. In addition, the components shown in the figures, their connections, couples, and relationships, and their functions, are meant to be exemplary only, and are not meant to limit the embodiments described herein.

In some embodiments, the present invention discloses a system and a method for geocoding coordinates of users, vehicles and destinations on a map. Geocoding may be a process of using the description of a location, e.g., a destination address, to reveal the latitude and longitude coordinates of that location. Users and vehicles (and non-fixed destinations) of the system may be tracked through the geocoding of their mobile devices, such as a smartphone or portable computer. Tracking may be defined as the action of persistent storing or using signals that are transmitted to GPS devices or received by a device from location emitting sensors, e.g., cellular towers, NFC near field communication devices, BLE Bluetooth low energy device, iBeacon technology, to determine the location, speed and direction of a user and/or vehicle in real time. The system may also allow for reverse geocoding, which may be a process of back (reverse) coding of coordinates to a readable destination description, e.g., the destination address.

A transmission system in the mobile device may communicate with a platform and route optimization server through a network, such as described in U.S. patent application Ser. No. 15/456,521, entitled, "Complex dynamic route sequencing for multi-vehicle fleets using traffic and real-world constraints", with a filing date on Mar. 11, 2017, and which is incorporated herein by reference in its entirety for all purposes.

The platform may be a software-based program implemented in a processor of a remote computing device that is also coupled with the network. For example, each user may transmit information about their current position through a position detection device coupled with an antenna, such as, e.g., a GPS system. A transmission may also include other information linked to the vehicle's current position, such as, e.g., a comparison of the change in coordinates with respect to time, which may be used by the platform to develop information about how a user is maneuvering through traffic and to determine existing traffic conditions, such as, e.g., traffic speed. The communication link between the mobile device and the platform may not be required to be maintained continuously open, such that the link may be disconnected after the position detection device transmits location data to the platform. The data from the user or vehicle may be added to a traffic database, and combining with other first-party tracked data from other users and/or from third-party traffic data sources, such as a traffic data vendor, a prediction module may develop information about current traffic conditions.

In at least one embodiment, the present invention discloses a system and a method to identify when a transit vehicle deviates from one or more system generated driving routes. The generated routes may comprise a primary route and a plurality of alternate routes. The alternate routes may be prioritized based on total distance, total time, or total cost based on an objective cost function to complete each route. A mobile device of a user or vehicle may be configured to generate positioning data indicative of its location. One or more suggested or optimized routes may be calculated and identified by the system to guide a driver of the vehicle to one or more destinations. The vehicle may also be a self-driving or an autonomous vehicle. As the transit vehicle travels along a generated route, its actual path of travel may be compared to the generated routes.

If the user of the mobile device or vehicle deviates from a generated route, an alert may be generated to indicate that the vehicle is being re-routed. Further analysis of the deviation data may be performed to determine a user or vehicle profile. The detection of route deviation may be spatial, e.g., distance, or temporal, e.g., time. A temporal deviation value may be calculated based on a comparison of the expected time to a current time of the corresponding transit vehicle. Subsequent stop times for the transit route may be determined based on the temporal deviation value. The temporal deviation value may be adjusted for traffic data, weather data, hazard data, and avoid zone data. The deviation may be computed in real time in regards to location and date and time the transit vehicle deviates from either a scheduled route or an average historical route.

FIG. 1 is a flowchart of a method for detecting a route deviation, according to at least one embodiment. Operation 110 geocodes coordinates of a user, a vehicle, and/or a destination on a map. Operation 120 tracks positioning data of the user, the vehicle, and/or the destination on the map to generate a tracked route. A sample reading of the data may be performed at a predetermined time interval, such as, e.g., 15 seconds. Operation 130 compares the tracked route to one or more generated routes. The generated routes may comprise a primary route and a plurality of alternate routes. The alternate routes may be prioritized based on total distance, total time, or total cost based on an objective cost function to complete each route. Generated routes may be optimized based on first party data and third party data. Operation 140 detects a deviation of the tracked route from a generated route. Operation 150 generates an alert to indicate that a route deviation has occurred. Optionally, the user or vehicle may be rerouted to correct the deviation. The detection of the route deviation may be spatial, e.g., distance, or temporal, e.g., time.

The system may access a schedule data for a transit route for a predetermined time and geographic area. A scheduled route may be a series of estimated times paired with geographic locations for transit destinations implemented by an administrator of the system or a self-learning machine. An average historical route may be an average of recorded times paired with averaged geographic locations from past routes on the transit system. A route and route deviation storing means may be used to store route deviations comparing deviated scheduled routes and deviated average historical routes, and may allow the system to learn from the stored information when a vehicle travels on a same or similar route again, further preventing a vehicle from deviating from a generated route. Once a deviation is identified, the data may be utilized to monitor and analyze drivers and vehicles. The deviating location points may be used to construct a new route leg, a new stop, or a new schedule for the transit route, if a positive value is determined for the deviation.

Figure 2:
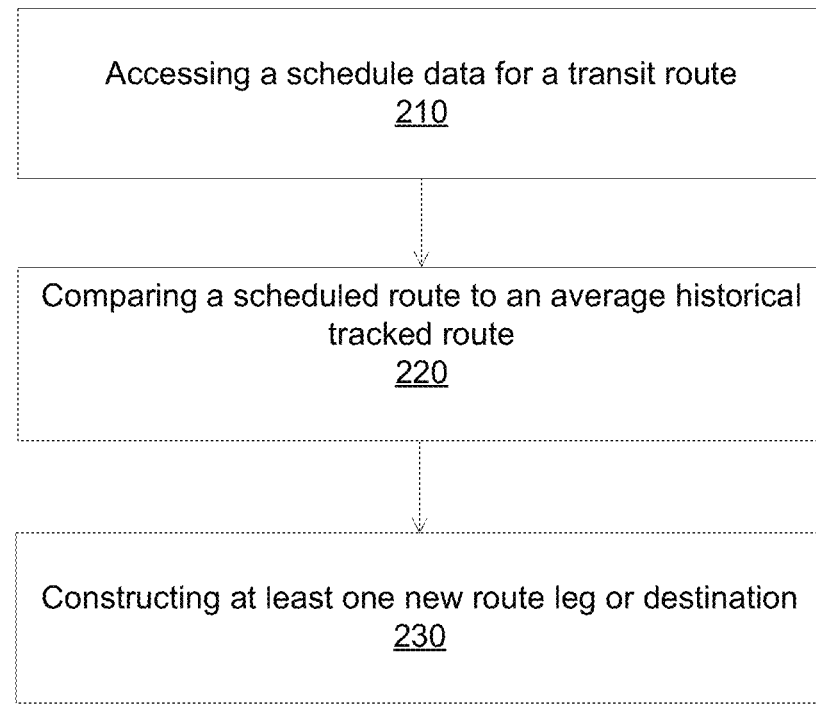
FIG. 2 is a flowchart of a method for comparing a deviated scheduled route to a deviated average historical route, according to at least one embodiment.

FIG. 2 is a flowchart of a method for comparing a deviated scheduled route to a deviated average historical route, according to at least one embodiment. Operation 210 accesses a schedule data for a transit route for a predetermined time and geographic area. Operation 220 compares the deviated scheduled route to the deviated average historical route to learn from the stored information when a vehicle travels on a same or similar route again. Operation 230 constructs at least one new route leg and/or destination based on the comparison of the deviated scheduled route and the deviated average historical route.

Figure 3A:
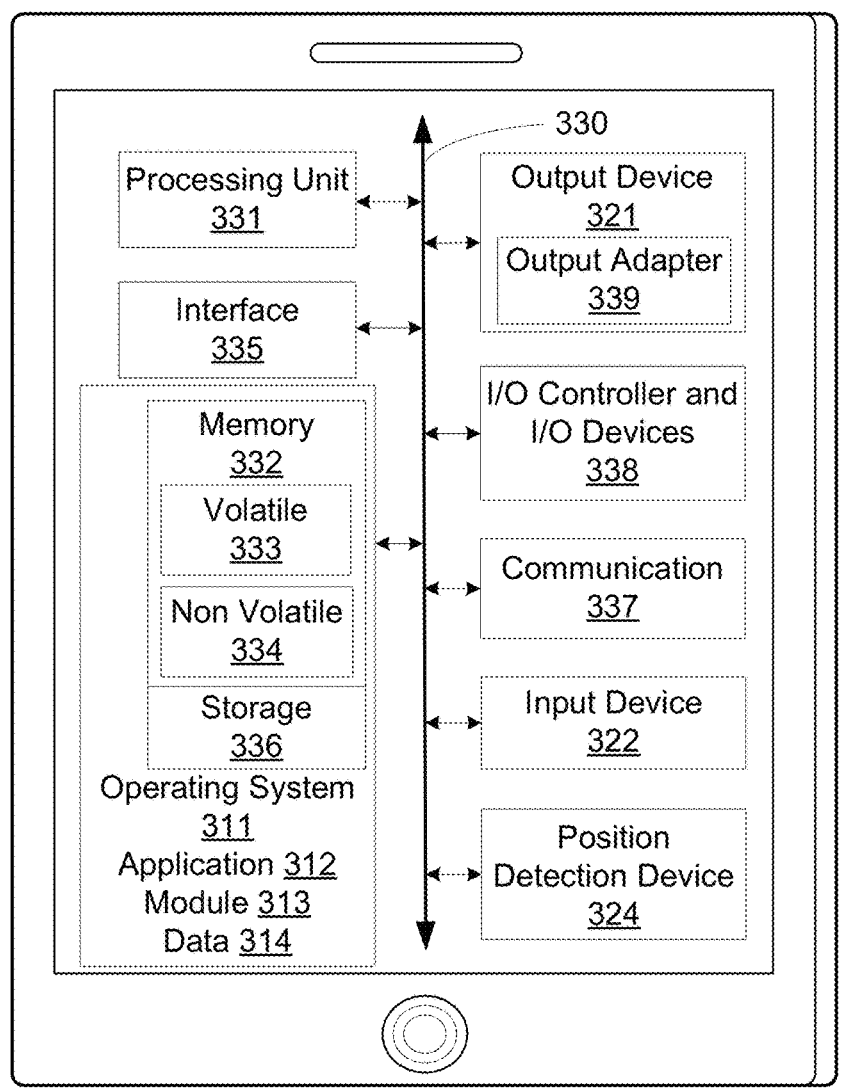
FIG. 3A illustrates a computing environment of a mobile device for implementing various aspects of the invention, according to at least one embodiment.

FIG. 3A illustrates a computing environment of a mobile device for implementing various aspects of the invention. The processing unit 331 may be any of various available processors, such as single microprocessor, dual microprocessors or other multiprocessor architectures. The system bus 330 may be any type of bus structures or architectures, such as 12-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), or Small Computer Systems Interface (SCST).

The system memory 332 may include volatile memory 333 and nonvolatile memory 334. Nonvolatile memory 334 may include read only memory (ROM), programmable ROM (PROM), electrically programmable ROM (EPROM), electrically erasable ROM (EEPROM), or flash memory. Volatile memory 333, may include random access memory (RAM), synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), or direct Rambus RAM (DRRAM).

The mobile device also includes storage media 336, such as removable/non-removable, volatile/nonvolatile disk storage, magnetic disk drive, floppy disk drive, tape drive, Jaz drive, Zip drive, LS-100 drive, flash memory card, memory stick, optical disk drive such as a compact disk ROM device (CD-ROM), CD recordable drive (CD-R Drive), CD rewritable drive (CD-RW Drive) or a digital versatile disk ROM drive (DVD-ROM). A removable or non-removable interface 335 may be used to facilitate connection.

The mobile device may further include software to operate in the computing environment, such as an operating system 311, system applications 312, program modules 313 and program data 314, which are stored either in system memory 332 or on disk storage 336. Various operating systems or combinations of operating systems may be used.

Input device 322 may be used to enter commands or data, and may include a pointing device such as a mouse, trackball, stylus, touch pad, keyboard, microphone, joystick, game pad, satellite dish, scanner, TV tuner card, sound card, digital camera, digital video camera, web camera, and the like, connected through interface ports 338. Interface ports 338 may include a serial port, a parallel port, a game port, a universal serial bus (USB), and a 1394 bus. The interface ports 338 may also accommodate output devices 321. For example, a USB port may be used to provide input to the mobile device and to output information from the mobile device to an output device 321. Output adapter 339, such as video or sound cards, is provided to connect to some output devices such as monitors, speakers, and printers.

The position detection device 324 may be a device that communicates with a plurality of positioning satellites, e.g., GPS satellites, to determine the geographical location of the mobile device, and thus the user. To determine the location of the user, the position detection device 324 searches for and collects GPS information or signals from four or more GPS satellites that are in view of the position detection device 324. Using the determined time interval between the broadcast time and reception time of each signal, the position detection device 324 may calculate the distance of the user relative to each of the four or more GPS satellites. These distance measurements, along with the position and time information received in the signals, allow the position detection device 324 to calculate the geographical location of the user.

The mobile device may be communicatively coupled to remote computers, such as, e.g., the platform, through the network. The remote computers may comprise a memory storage device, and may be a personal computer, a server, a router, a network PC, a workstation, a microprocessor based appliance, a peer device or other common network node and the like, and typically includes many or all of the elements described relative to the mobile device. Remote computers may be connected to through a network interface and communication connection 337, with wire or wireless connections. A network interface may be communication networks such as local-area networks (LAN), wide area networks (WAN) or wireless connection networks, or by cellular network communication technology. LAN technologies include Fiber Distributed Data Interface (FDDI), Copper Distributed Data Interface (CDDI), Ethernet/IEEE 1202.3, Token Ring/IEEE 1202.5 and the like. WAN technologies include, but are not limited to, point-to-point links, circuit switching networks like Integrated Services Digital Networks (ISDN) and variations thereon, packet switching networks, and Digital Subscriber Lines (DSL).

Figure 3B:
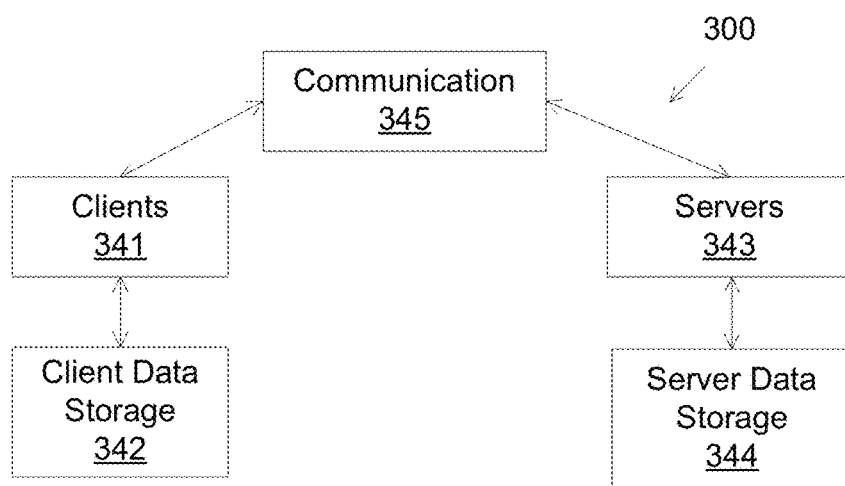
FIG. 3B is a schematic block diagram of a sample computing environment with which the present invention may interact.

FIG. 3B is a schematic block diagram of a sample computing environment 300 with which the present invention may interact. The system includes a plurality of client systems 341. The platform of the present system may be a program implemented by a client system 341. The system also includes a plurality of servers 343. The servers 343 may be used to employ the present invention. The system includes a communication network 345 to facilitate communications between the clients 341 and the servers 343. Client data storage 342, connected to client system 341, may store information locally. Similarly, the server 343 may include server data storages 344.

Figure 4:
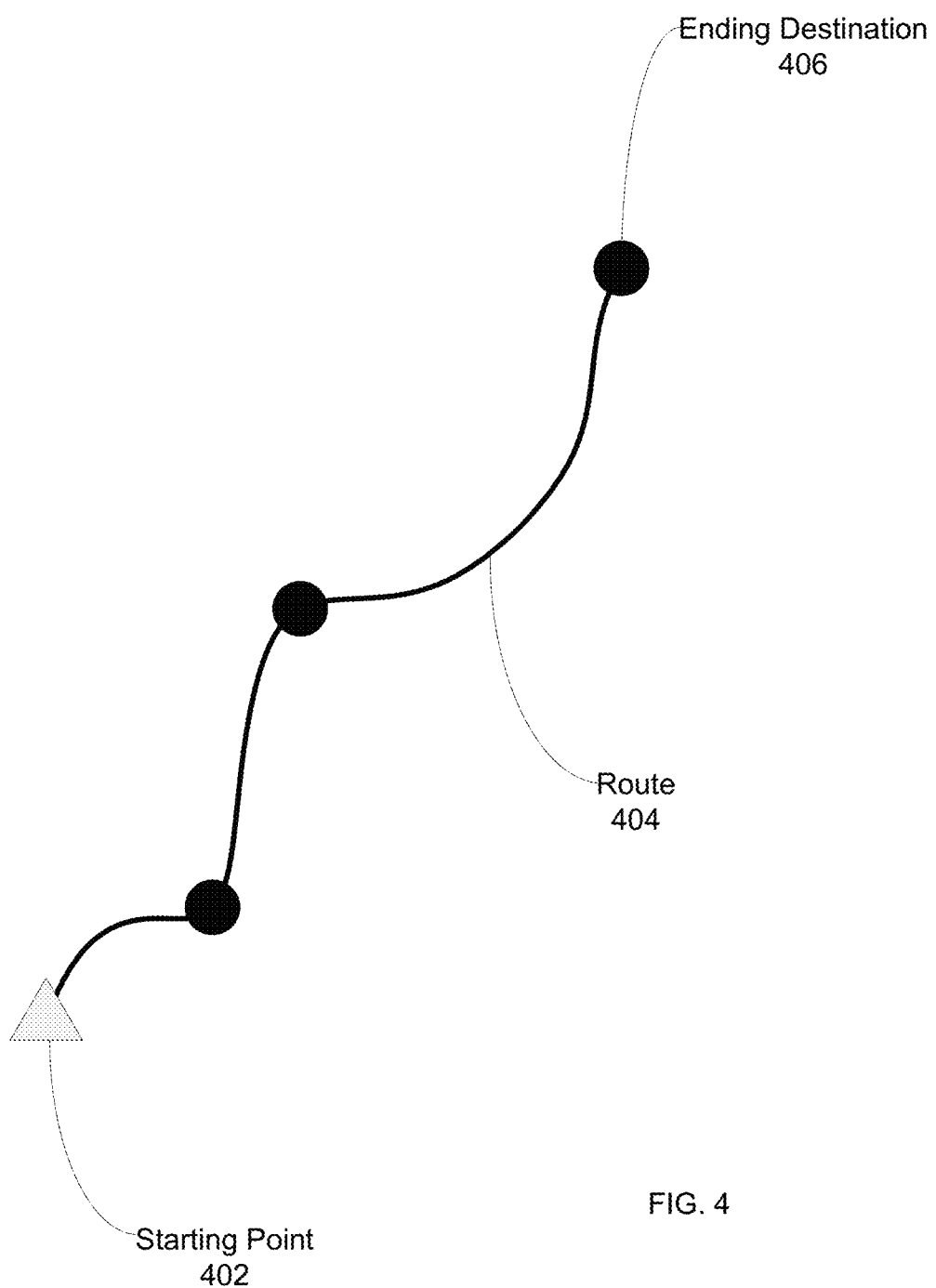
FIG. 4 is an example of a generated route comprising multiple destination points, according to at least one embodiment.

FIG. 4 is an example of a generated route comprising multiple destination points, according to at least one embodiment. The starting point 402 may be a position where an assigned transit vehicle begins its route 404, and the ending destination 406 may be the last destination of the route. The ending destination 406 may be a different geographic location than the starting point 402, or they may be the same geographic location—whereby the route 404 is a round-trip route. The generated route may be a system optimized route that takes into account first- and third-party traffic data, weather data, hazard data, and/or avoidance zone data. Additionally, the optimized route may be based on current data and/or historical data. In some embodiments, the generated routes may comprise a primary route and a plurality of alternate routes. The alternate routes may be prioritized based on total distance, total time, or total cost based on an objective cost function to complete each route.

Figure 5A:
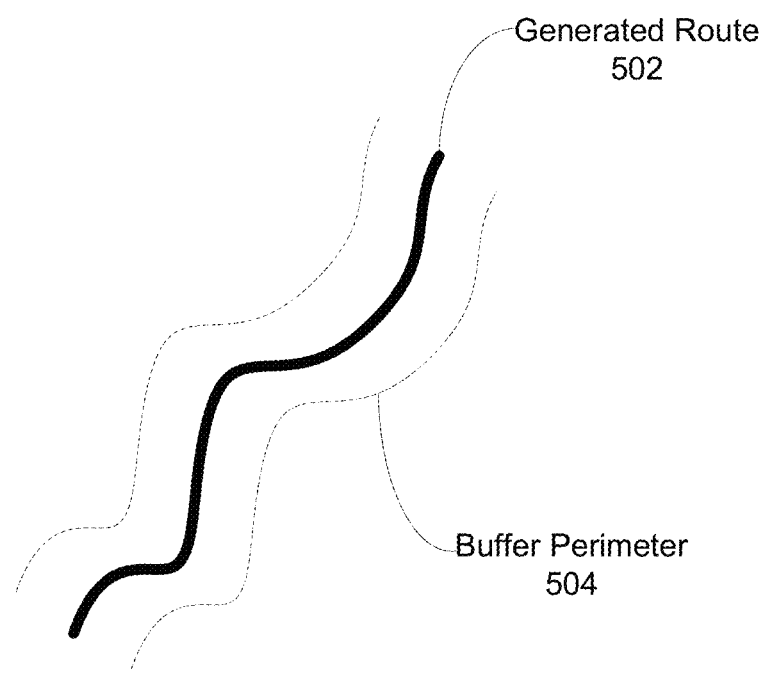
FIGS. 5A-B are schematic diagrams of a route detection mechanism, according to at least one embodiment.
Figure 5B:
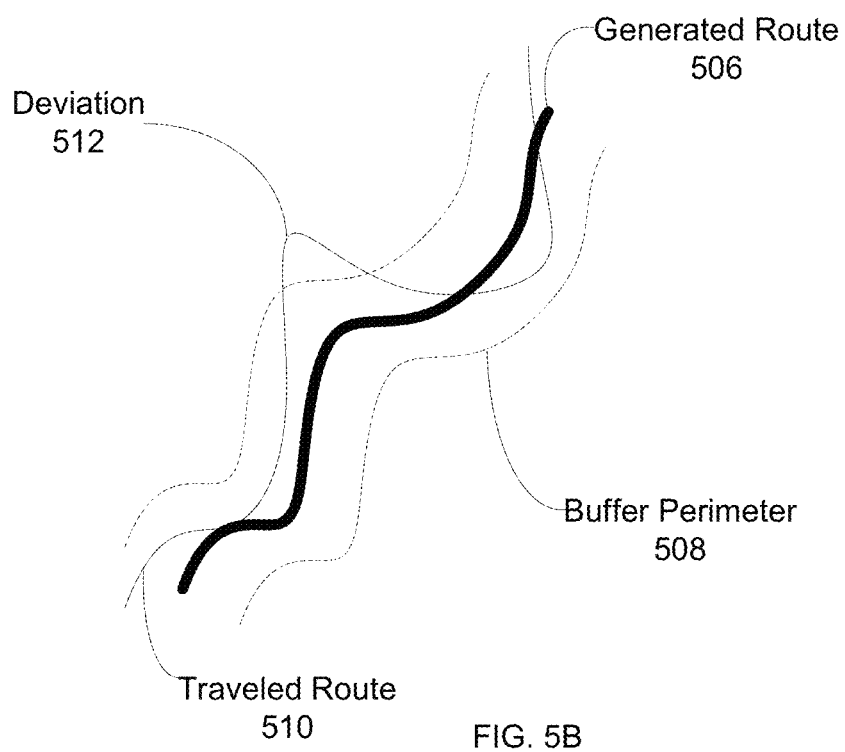

FIGS. 5A-5B are schematic diagrams of a route detection mechanism, according to at least one embodiment. FIG. 5A shows a generated route 502 surrounded on both sides by a pair of buffer perimeter 504. The pair of buffer perimeter 504 may be defined by half of its total width, which may be the distance to the center of the roadway of the generated route 502. The width of a pair of buffer perimeter 504 may be a fixed distance, such as set by an administrator of the system or a machine learning process. In some embodiments, the width of a pair of buffer perimeters may vary based on road network data, e.g., traffic data. For example, a path of the generated route may correspond to a bridge or an overpass on the route, therefore the half-width of a pair of buffer perimeters may be directly proportional to the half-width of the roadway of the generated route. As another example, a road segment of a highway is generally wider than that of a residential street, and therefore the width of a pair of buffer perimeter 504 may be wider for the highway than for the residential street. A single route may comprise a pair of buffer perimeter 504 comprising both a fixed width and a variable width, depending on road network data available for particular roadway segments belonging to the route. In addition, the road network data may comprise current data and historical data. Historical data may be location points paired with time stamps collected from vehicles following the same route in the past.

FIG. 5B shows an example of a route deviation detection of a generated route, according to at least one embodiment. A generated route 506 may be surrounded by a pair of buffer perimeter 508. A comparison of the location of the transit vehicle to the pair of buffer perimeter 508 may determine whether the vehicle has deviated from the generated route 506. The comparison may involve calculating a distance of the transit vehicle's position to the center of the width (half-width) of a pair of buffer perimeter 508. When the distance of a traveled route 510 is larger than half of the width of the pair of buffer perimeters, a deviation 512 of the vehicle from the route may be detected. In other words, if the transit vehicle travels beyond either side of the buffer perimeter, a route deviation may be detected.

Figure 6A:
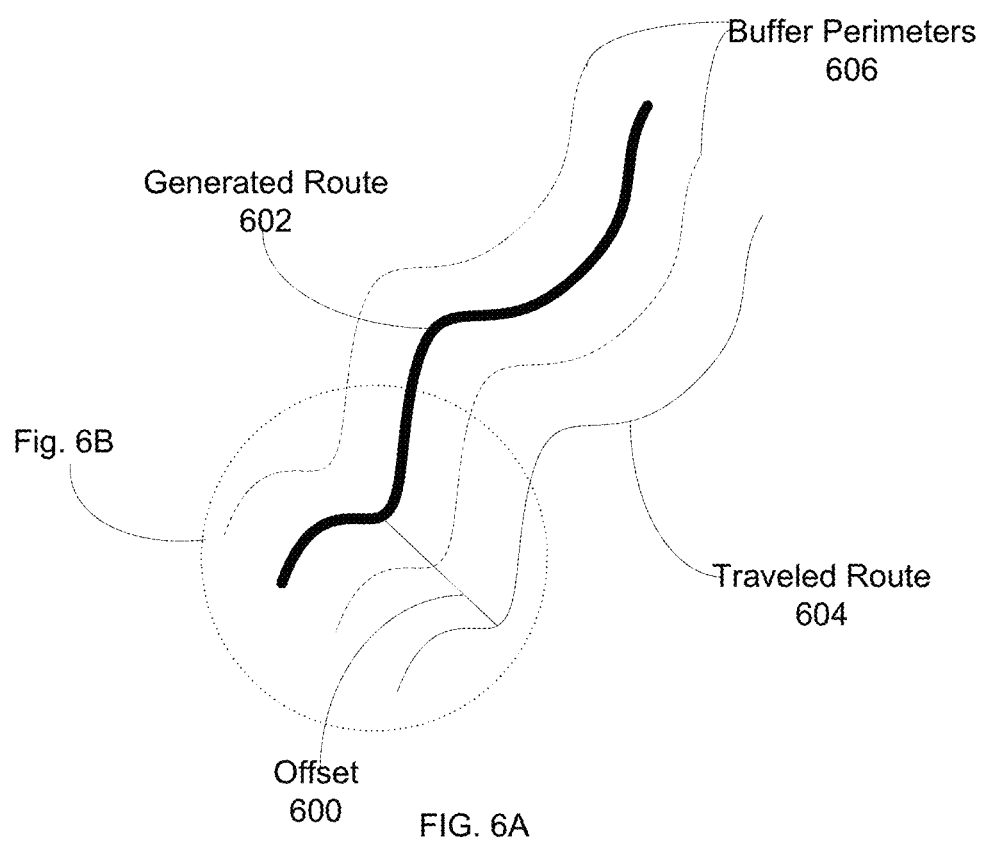
FIGS. 6A-B are schematic diagrams of an offset identification of a route deviation detection mechanism, according to at least one embodiment.
Figure 6B:
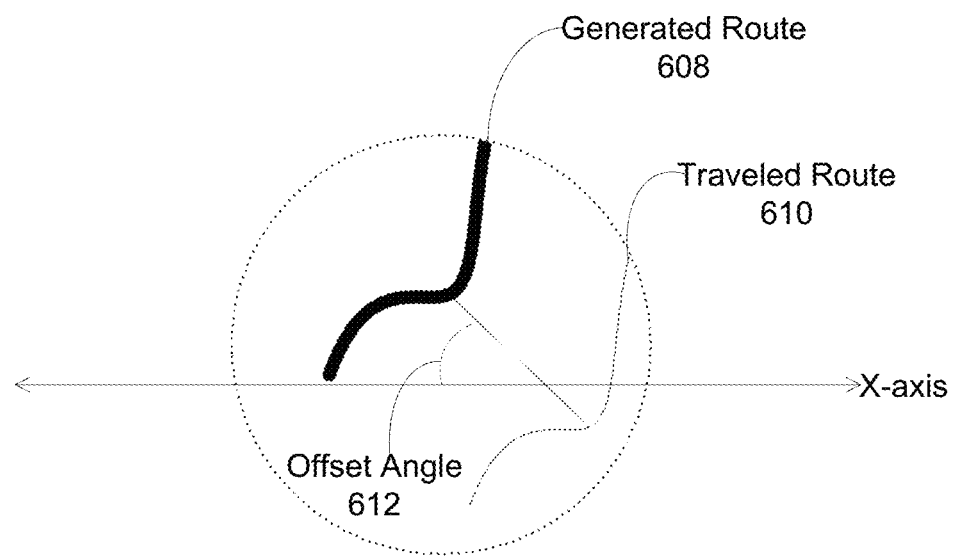

FIGS. 6A-B are schematic diagrams of an offset identification of a route deviation detection mechanism, according to at least one embodiment. In the FIG. 6A, an offset 600 may occur when there is a map match between a generated route 602 and a transit vehicle's traveled route 604, wherein the spatial patterns of the generated route 602 and the traveled route 604 matches, and the traveled route pattern lies outside of a corresponding pair of buffer perimeter 606. Instead of detecting a route deviation in this situation, the system may determine that there may be an error in the map data, route data, and/or position data. For example, the map data may be corrupted, altered or shifted in a direction, which causes the rest of the data points to shift in an offset manner. In other embodiments, the offset 600 may be determined by the system to be multiple similar routes of a similar location.

FIG. 6B is an enlarged view of an offset identification between a generated route 608 and a traveled route 610, according to at least one embodiment. The offset may be indicated with a line segment drawn from a point of the generated route 608 to the corresponding point of the traveled route 610, or vice versa. The corresponding point may be defined as the spatial matching point of the matching pattern of the generated route 608 and the traveled route 610. An offset angle 612 may be determined relative to an X-axis to calculate its directional position, e.g., north, west, east, and south, of the generated route relative to the traveled route. The directional position may be used to manually or automatically correct the error in, or the output data of, the system.

Figure 7A:
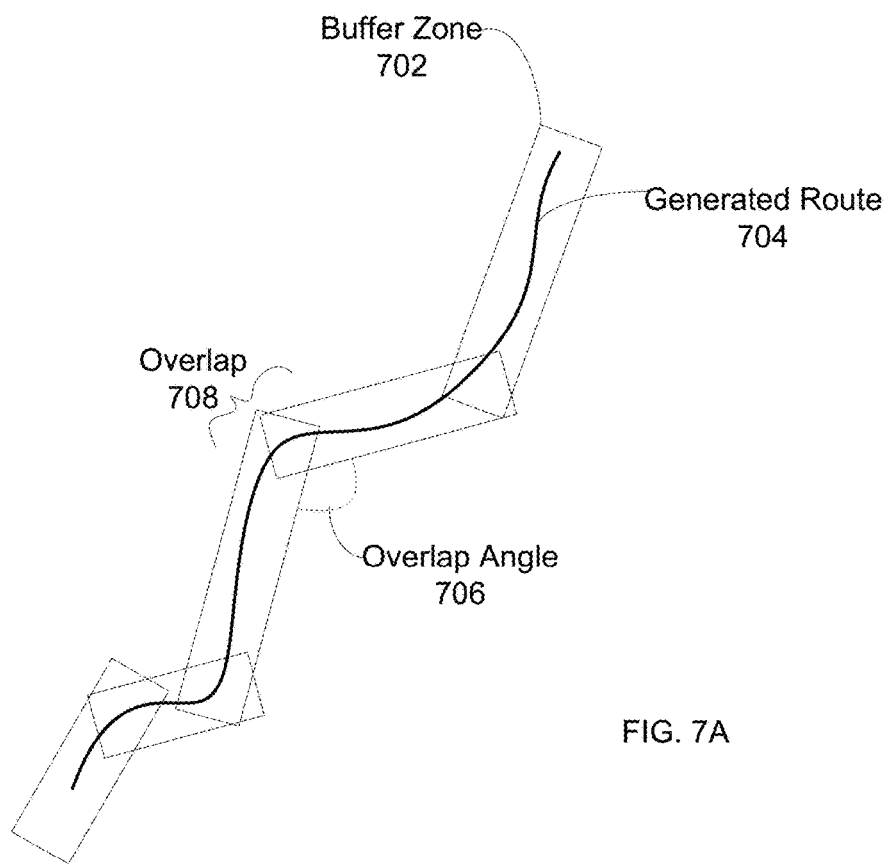
FIGS. 7A-B shows a method of generating a pair of buffer perimeters in a route deviation detection mechanism, according to at least one embodiment.
Figure 7B:
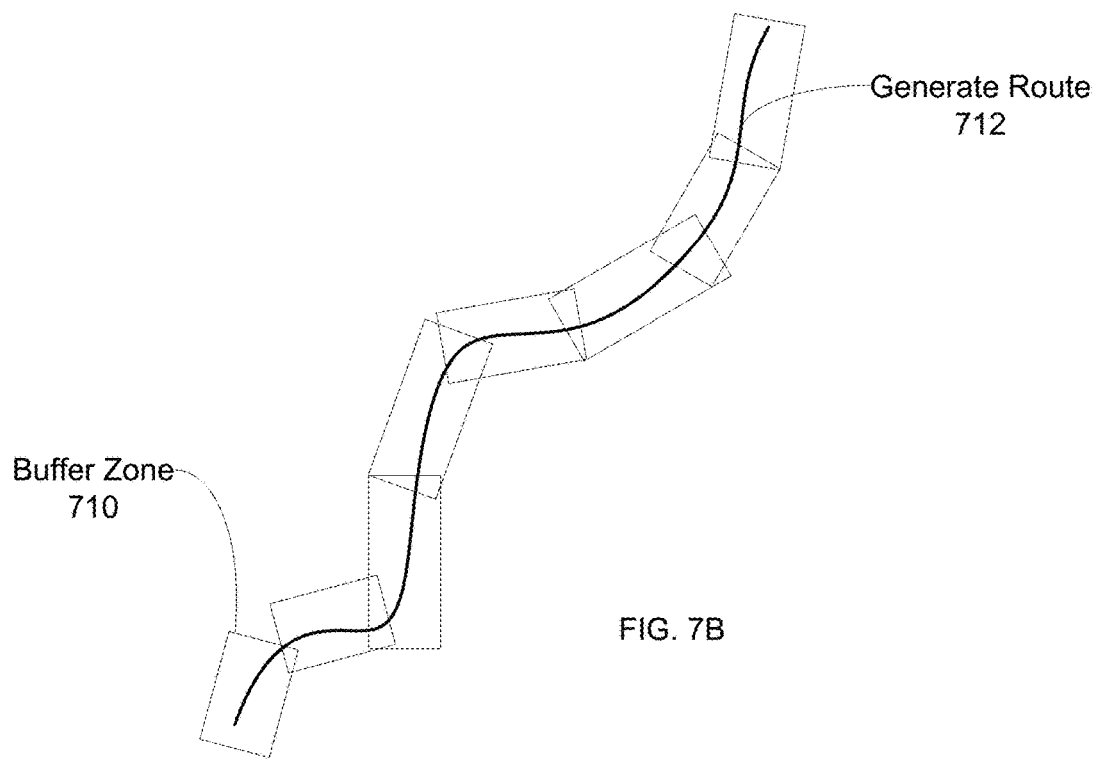

FIGS. 7A-7B shows a method of generating a pair of buffer perimeters in a route deviation detection mechanism, according to at least one embodiment. In FIG. 7A, rectangular-shaped buffer zone 702 may be overlaid on top of generated route 704. The generated route 704 may be divided into multiple segments by a plurality of buffer zone 702. Side edges of the lengths of the buffer zone 702 may correspond to the resultant positions of the pair of buffer perimeters shown in the previous figure. The width of each buffer zone 702 may be positioned perpendicular to the average direction of the corresponding road segment of the generated route 704, and may be placed at its width's midway point, or it may be shifted in one direction, depending on the desired placement. The two or more buffer zone 702 may overlap due to a change in direction of the juxtapose buffer zone 702, which may indicate that there is a change in direction of the route. Overlap angle 706 of overlap 708 between a pair of adjacent buffer zone 702 may be calculated to determine the degree or severity of the change in direction, such as seen in a left- or right-turn intersection. In general, a larger overlap angle 706 may indicate a wider and gradual change in direction compared to a smaller overlap angle 706.

In FIG. 7B, the buffer zones may be reduced in length, which is inversely proportional to frequency, to increase segmented covered of the generated route. In general, as buffer zone 710 increases in frequency and reduces in length, accuracy and precision of the resultant pair of buffer perimeters' pattern compared to the pattern of generated route 712 may increase. For example, a pair of buffer perimeters constructed from 10 buffer zone 710 may be more accurate than a single pair of buffer perimeters constructed from five buffer zones. The amount of buffer zone 710 may be directly proportional to the ability of the system to generate smooth curves of the resultant pair of buffer perimeters. The widths and lengths of the buffers zone 710 and hence the position of the resultant pair of buffer perimeters may be a fixed value, or it may be a variable value depending on road network data, e.g., traffic data. Each buffer zone 710 of generated route 712 may be of a uniform width and/or length, or it may be of various widths and/or lengths correlating to landmarks, e.g., bridges.

Figure 8:
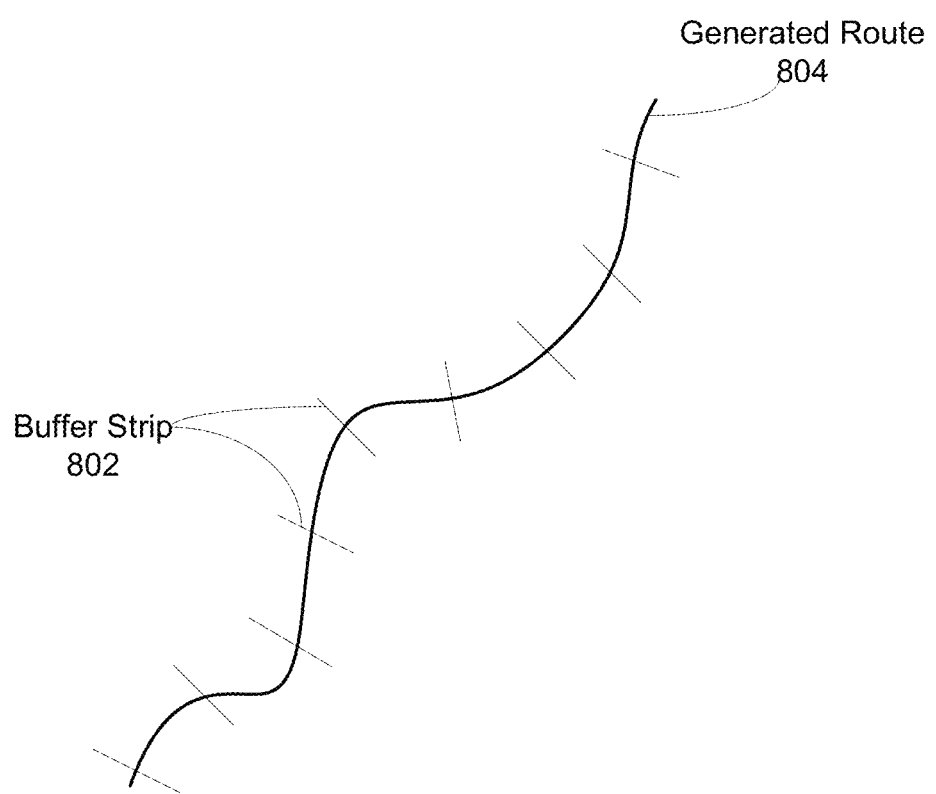
FIG. 8 depicts another method of generating a pair of buffer perimeters in a route deviation detection mechanism, according to at least one embodiment.

FIG. 8 depicts another method of generating a pair of buffer perimeters in a route deviation detection mechanism, according to at least one embodiment. Instead of, or in addition to buffer zones, a pair of buffer perimeters may be constructed from multiple buffer strip 802. The buffer strip 802 may be one-dimensional line segments positioned perpendicular to and along generated route 804, and may intersect generated route 804 at the buffer strip 802's midway point, or it may be shifted in one direction, depending on the desired placement and geographic limitations. The endpoints of the buffer strip 802 may correspond to the resultant positions of a pair of buffer perimeters. The amount of buffer strip 802 may be directly proportional to the ability of the system to generate smooth curves of the resultant pair of buffer perimeters, which also indicates accuracy of the system. The widths of buffers strip 802 and hence the position of the resultant pair of buffer perimeters may be a fixed value, or it may be a variable value depending on road network data, e.g., traffic data. The buffer strip 802 of generated route 804 may be of a uniform width, or it may be of various widths.

Figure 9:
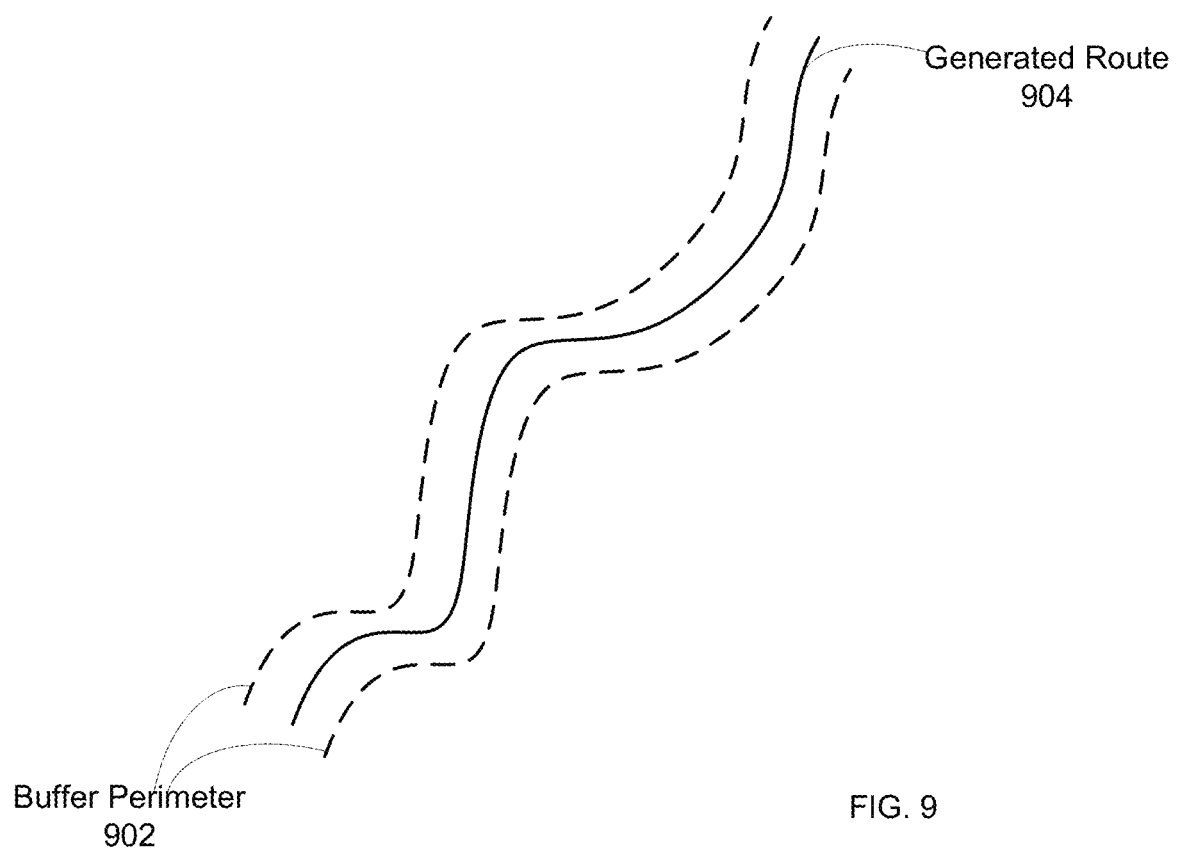
FIG. 9 shows a sample resultant pair of buffer perimeters constructed from one or more methods of the present invention, according to at least one embodiment.

FIG. 9 shows a sample resultant pair of buffer perimeters constructed from one or more methods of the present invention, according to at least one embodiment. A pair of buffer perimeter 902 may comprise smooth curves, or rigged curves, dependent on the amount of buffer zones and/or buffer strips used in its construction—as previously discussed. The width of the pair of buffer perimeter 902 may be a fixed width generated by the system or inputted by a system administrator, or it may be a varying width depending on road network data. The mid-point of the pair of buffer perimeter 902 may align with the center position of a roadway segment of generated route 904, or it may be off-centered, e.g., shifted in a right or left direction relative to the roadway segment, and also dependent upon roadway network data.

Figure 10:
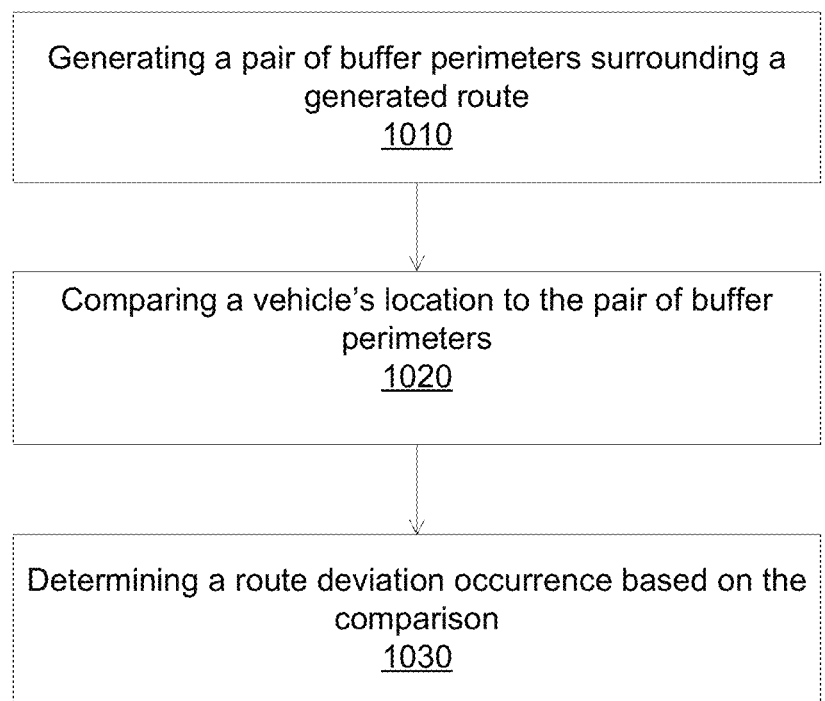
FIG. 10 is a flowchart of a method for generating a pair of buffer perimeter on a generated route to detect a route deviation.

FIG. 10 is a flowchart of a method for generating a pair of buffer perimeter on a generated route to detect a route deviation. Operation 1010 generates a pair of buffer perimeter surrounding a generated route. The pair of buffer perimeter may enclose both sides of the generated route. Operation 1020 compares a transit vehicle's location to the pair of buffer perimeter. Operation 1030 determines a route deviation occurrence based on the comparison of the vehicle's location to the pair of buffer perimeter. A route deviation occurrence may be determined to have occurred if the vehicle's location is disposed beyond the buffer perimeter width.

Figure 11:
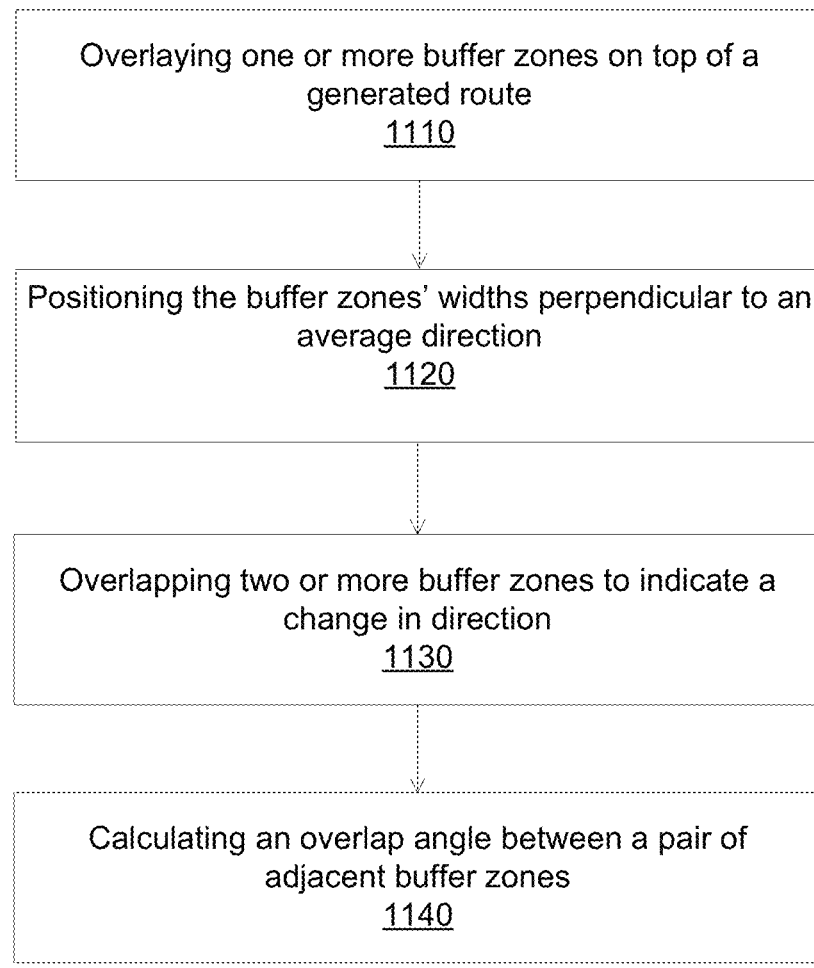
FIG. 11 is a flowchart of a method for generating a pair of buffer perimeter on a generated route using buffer zones, according to at least one embodiment.

FIG. 11 is a flowchart of a method for generating a pair of buffer perimeter on a generated route using buffer zones, according to at least one embodiment. Operation 1110 overlays one or more buffer zones on top of a generated route. Side edges of the lengths of the buffer zone may correspond to the resultant positions of the pair of buffer perimeters shown in a previous figure. Operation 1120 positions the buffer zones' widths perpendicular to an average direction of a road segment of a generated route. Operation 1130 overlaps two or more buffer zones to indicate a change in direction of a generated route. Operation 1140 calculates an overlap angle between a pair of adjacent buffer zones to determine a degree of change in direction of the generated route. The overlap angle may be directly proportional to the degree of change in direction of the generated route.

FIG. 12 is a flowchart of a method for generating a pair of buffer perimeter on a generated route using buffer strips, according to at least one embodiment. Operation 1210 overlays one or more buffer strips on top of a generated route. Endpoints of the buffer strips may correspond to the resultant positions of the pair of buffer perimeters shown in a previous figure. Operation 1220 positions the buffer strips' widths perpendicular to the generated route.

In yet another aspect, the present invention discloses a system and a method to filter and analyze route deviation data and road network data when a transit vehicle deviates from one or more system generated driving routes. The generated routes may comprise a primary route and a plurality of alternate routes. The alternate routes may be prioritized based on total distance, total time, or total cost based on an objective cost function to complete each route. The system may further analyze the route deviation data and/or road network data to build a driver or vehicle profile. The mobile device of the driver or vehicle is configured to generate positioning data indicative of its location. One or more suggested or optimized route may be calculated and identified by the system to guide the driver of the vehicle to one or more destinations. Road network data, including traffic flow information and traffic incident information, obtained through a traffic management platform such as described in U.S. patent application Ser. No. 15/456,521, entitled, "Complex dynamic route sequencing for multi-vehicle fleets using traffic and real-world constraints", with a filing date on Mar. 11, 2017, and which is incorporated herein by reference in its entirety for all purposes, may be used to generate the optimized routes. In some embodiments, the data samples from the mobile data sources may be supplemented with data from one or more other sources, such as by obtaining data readings from physical sensors that are positioned near or embedded in the roads. As the transit vehicle travels along a generated route, its actual path of travel may be compared to one or more generated routes to determine deviation, qualitatively and quantitatively. The system may perform a filtering method to the route deviation data and/or road network data, e.g., outliers may be removed, prior to the analyses. Both of the route deviation data and the road network data may comprise current or real-time data, and/or historical data. The filtered data may be stored and analyzed to build a persona or driver profile of a driver.

If the user of the mobile device or vehicle deviates from a generated route, a message may be generated to indicate that the vehicle is being re-routed. The detection of route deviation may be spatial, e.g., distance, or temporal, e.g., time. The system may access a schedule data for a transit route for a predetermined time and geographic area. A temporal deviation value may be calculated based on a comparison of the expected time to a current time of the corresponding transit vehicle. Subsequent stop times for the transit route based on the temporal deviation value may be determined based on the temporal deviation value. The temporal deviation value may be adjusted for traffic data, weather data, hazard data, and avoid zone data. The deviation may be computed in real time in regards to location and date and time the transit vehicle deviates from either a scheduled route or an average historical route.

A scheduled route may be a series of estimated times paired with geographic locations for transit destinations implemented by an administrator of the system or a self-learning machine. An average historical route may be an average of recorded times paired with averaged geographic locations from past routes on the transit system. A route and route deviation storing means may be used to store route deviations compared to scheduled routes and average historical routes, and may allow the system to learn from the stored information when a vehicle travels on a same or similar route again, further preventing a vehicle from deviating from one or more generated routes. Once the deviation is identified, the data may be utilized to monitor and analyze drivers and vehicles. The deviating location points may be used to construct a new route leg, a new stop, or a new schedule for the transit route.

Figure 13:
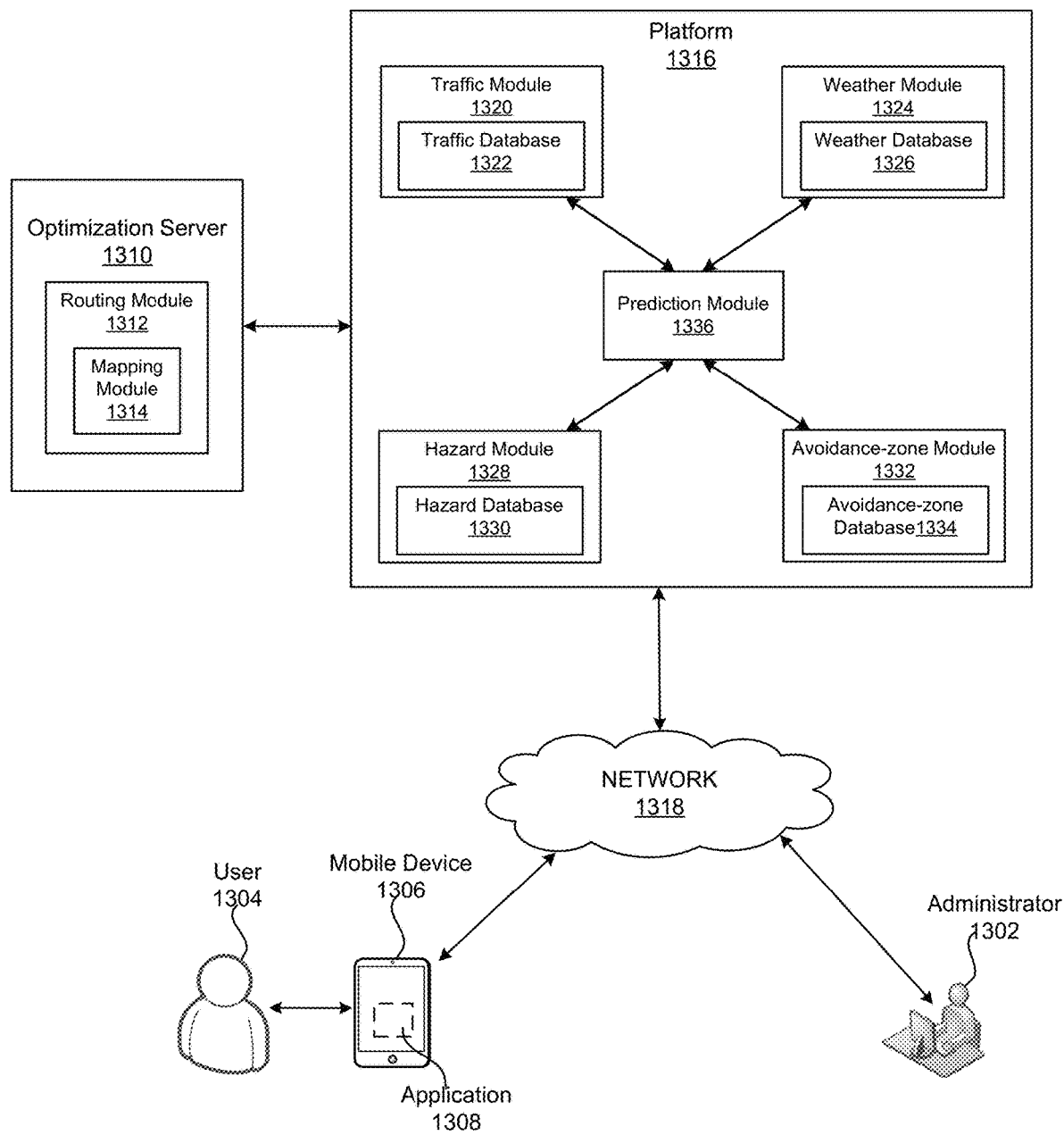
FIG. 13 is a high-level view of a network communication environment, according to at least one embodiment.

FIG. 13 is a high-level view of a network communication environment, according to at least one embodiment. FIG. 13 illustrates an administrator 1302; a user 1304; a mobile device 1306; an application 1308; an optimization server 1310 comprising a routing module 1312 and a mapping module 1314; and a platform 1316 communicatively coupled to a communication network 1318 comprising a traffic module 1320 and a traffic database 1322, a weather module 1324 and a weather database 1326, a hazard module 1328 and a hazard database 1330, and an avoidance-zone module 1332, an avoidance-zone database 1334, and a prediction module 1336.

The user may be a vehicle operator accessing the network through the application 1308 of the mobile device 1306, or it may be a software application running inside of an autonomous vehicle's computer. The mobile device 1306 may be a computing device comprising a central processing unit (CPU), an operating system, wireless network connectivity, a positioning detection device, and etc., such as, e.g., a smartphone, tablet, personal digital assistant (PDA), smart watch and other personal electronic devices. The network 1318 may be a pathway that provides wireless communication, e.g., the Internet. The application 1308 may access the optimization server 1310 through the network 1318 to obtain predicted traffic conditions and optimized driving routes. A route may be a way or course planned and taken for getting from a starting point to one or multiple destinations. A road may be a surface created for vehicles to travel on. A segment may be a portion of a road.

The route may be optimized for the shortest distance, shortest time, or shortest time taking into consideration real-time, historical, and predicted future information of manually inputted data, third-party data, and/or first-party vehicle-tracked traffic data and/or user-tracked behavioral data. The optimization server may continually and dynamically update the route at a predetermined time interval, as real-time traffic conditions change, and/or as parameters and constraints are modified by an internal or external computer system. Optimized routes may be assigned to a vehicle by an automated process based on rules, triggers, and/or workflows, or by an administrator. Contrary to existing systems, which may not change a generated route and merely estimate the impact that various constraints will have on arrival and departure times, the system of the present invention completely (and continually) re-sequences the entire route based on a variety of dynamic data for the expected time and at the expected area that the vehicle will traverse through.

The administrator 1302 may provide parameters and constraints to the route, such as, e.g., the addresses of multiple destinations and respective arrival times. The application 1308 may use the inputs to predict and to recommend to a user of the mobile device 1306 a sequence that should be taken to reach the plurality of destinations. The routes generated may comprise driving directions for the vehicle to follow based on the inputs. Driving directions may restrict the vehicle to travel on designated roadways. The application 1308 may identify multiple route options from the current location of the one or more vehicles to one or more destinations.

For each route, the optimization server 1310 may receive real-time traffic information that is available for segments of the route from: the traffic module 1320, the weather module 1324, the hazard module 1328, and the avoidance-zone module 1332. Each of the aforementioned modules may be communicatively coupled to one or more sensors positioned to record respective data on the road segments, such as, e.g., a speed radar to determine traffic speed, and/or sensors positioned in vehicles being operated by the user 1304, such as, e.g., a vehicle position detection device. The sensors may provide real-time traffic information to the modules of the platform, or if real-time information is not available, historical traffic information may be provided through a historical database of past sensed data. The historical traffic information retrieved preferably comprises similar current circumstances for the road segment, such as, e.g., weather condition and time of day.

An example of a sensor positioned along roadways that may provide traffic data input to the platform 1316 is a loop sensor that may be capable of measuring the number of vehicles passing above the sensor per unit time, vehicle speed and/or other traffic flow data. The sensors may also include cameras, motion sensors, radar ranging devices, RFID devices, and other types of sensors positioned near or embedded within a road. Another example is a digital message sign on or near route segments to inform drivers about upcoming road conditions, such as, e.g., road maintenance and road closure. In addition to the message being displayed, other traffic data that may be transmitted includes: the conditions that caused the message to display, the estimated length of any traffic restrictions in effect, the name of the road that the segment is a part of, and the location of the segment, such as, e.g., state, city, and/or geographical coordinates. In some embodiments, the electronic message information may be provided by the Department of Transportation (DOT) of the respective state in which the road is located. Each state may maintain its own historical database comprising past displayed messages that may be accessible through the network.

An example of a sensor positioned in vehicles that are operated by the user includes a positioning circuitry configured to determine a geographic position of the mobile device 1306. The circuitry may include sensing devices that measure the mobile device's travel data, e.g., traveling distance, speed, and direction. Detectors and/or sensors within the positioning circuitry may include an accelerometer and/or a magnetic sensor embedded within the mobile device. The accelerometer may be operable to detect, recognize, and/or measure the rate of change of translational and/or rotational movement. The magnetic sensor, e.g., a compass, may be configured to generate data indicative of a heading. Data from the accelerometer and the magnetic sensor may indicate orientation of the mobile device, and thus the vehicle. Another example is an on-board diagnostic sensor sensing vehicle attributes, such as carbon dioxide emissions. Carbon dioxide emission may be detected by the sensor or it may be computed by the miles-per-gallon (MPG) value of the vehicle assigned to the route, obtained from the vehicle manufacturer. The optimization server may re-sequence the destinations of one or more routes when carbon dioxide emissions data surpasses a predetermined threshold. For example, if the system determines that carbon dioxide emissions level surpasses the acceptable threshold level for a certain route that is caused by extreme increases in elevation, e.g., hills, then the optimization server may re-sequence the destinations of the route to avoid such road segments. Through optimizing routes for carbon dioxide emissions, the system may be able to reduce vehicle stress, lower fuel consumption, and reduce travel time and/or distance.

For each segment of the route for which real-time traffic information is not available, the optimization server may request and receive historical information on the segment from: the traffic database 1322, the weather database 1326, the hazard database 1330, and the avoidance-zone database 1334. The historical information requested is preferably under similar current circumstances, such as day, month, time of day, and/or weather condition—if available. Driving directions may be generated based on real-time traffic information, gathered historical traffic information and/or predicted future information, while taking into consideration the route parameters and constraints set by the administrator or an automatic machine learning process. If information about the road speeds or road slowdowns is not available, then speed and travel time predictions may be derived or approximated from a first party and/or a third party database of posted minimum and maximum speed limits along the segments of the road that will be travelled in one or more routes.

The traffic module 1320 may store real-time traffic information of segments of roads and transmits to the optimization server upon request. For each segment of a route identified by the routing module 1312 for which real-time traffic information is not available, the traffic module 1320 requests information of past traffic conditions under similar circumstances from the traffic database 1322. Traffic information that is stored in the traffic database 1322 may include one or more of the following: average vehicle speed, amount of traffic congestion, an indication of whether the segment is open or closed, and etc. For example, the traffic module 1320 may be communicatively coupled to a third-party data source to obtain real-time information that traffic on Broadway Street is slowed down by 5 MPH, or that based on a predicted future information, the current travel speed on Broadway Street is 0.25 times slower or faster than the expected travel speed at a specific point of time in the future.

In some embodiments, the traffic module 1320 may update real-time traffic information and store historical traffic information in the traffic database 1322 based on information provided by one or more sensors positioned to record traffic data on road segments, such as, e.g., a speed radar to determine traffic speed, and/or a sensor positioned in vehicles being operated by the user 1304, such as, e.g., a vehicle position tracking device and an internal or external temperature sensor. For example, measurements of vehicle speed on a segment of a road may allow the traffic module 1320 to determine whether the segment is congested.

Additionally, the administrator 1302 may manually update traffic information by modifying the traffic database 1322, e.g., such as condition and time, for a specific road segment. For example, images captured by cameras on a segment may be used by the administrator to determine whether it is congested, whether an accident or construction zone is present, and the speed of traffic on the segment. Using the information obtained from the images, the administrator 1302 can update the traffic module 1320 and/or the traffic database 1322 manually. The administrator 1302 may specify a time to live (TTL), after which the congestion information may self-delete from the traffic database 1322 such that it no longer impacts the optimization server 1310. The administrator 1302 may apply a manual override to a single route, or update a central database so that all routes in the system may access the manually inputted data.

The traffic module 1320 transmits real-time traffic information and historical traffic information stored in the traffic database 1322 to the prediction module 1336 upon request. The prediction module 1336 communicates with the optimization server 1310 to compute a route sequence based on traffic congestion on the road segments being traveled. For example, the same route may be sequenced differently when considering time-of-day and time-of-year specific traffic patterns.

The hazard module 1328 may store real-time information on existing traffic hazards, e.g., vehicle collisions, and special conditions, e.g., road construction zones. For each segment of a route identified by the routing module 1312, the hazard module 1328 may request information about past road hazards from the hazard database, such as, e.g., the amount and type of road hazards that have occurred in the past under similar conditions. The information may be organized by month, day, time, and weather condition.

For example, the hazard database 1330 may store the information that there have been 11 road hazards within the last two years for a certain segment of Sunset Boulevard in Los Angeles on December 12, between 7 AM and 8 AM when the skies are clear with no adverse weather condition. The prediction module 1336 may then compare this information with the current scenario to predict real-time traffic conditions. If the current scenario matches, such that it is also December 12, between 7 AM and 8 AM with clear skies and no adverse weather condition, then the prediction module 1336 may use this data to predict a likelihood of there being a hazard. On the other hand, if the current scenario does not match, the prediction module 1336 may discard this data point and rely on another.

The weather module 1324 may store real-time weather information and forecast weather information of different regions and road segments, and may transmit the data to the prediction module 1336 upon request. Weather information may include one or more of the following: temperature, wind speed, wind direction, sky condition, fog density, ice accumulation levels, rate and amount of snowfall and rainfall, and etc.

For each segment of a route identified by the routing module 1312 where current weather information is unavailable, the prediction module 1336 may request from the weather database 1326 past weather information for the geography that encompasses the area in a reasonable vicinity of the route. The prediction module 1336 may use real-time weather information with past weather information to predict traffic conditions on a road at a precise future geographic location of the driver or vehicle. For each segment, the weather database 1326 includes different weather conditions and respective road conditions that have resulted in the past and over a specified time interval. Therefore, as an example, if the current weather condition is wet and raining with 10 MPH wind speed towards the North-West direction, the prediction module 1336 may compare that with similar past weather conditions to predict the current road condition for the segment. If traffic tends to slow down by, e.g., 5 MPH during such weather condition, then the prediction module 1336 may conclude that the current vehicle speed is also slowed by 5 MPH. The prediction module 1336 may communicate with the optimization server 1310 to provide the user with an optimized route sequence.

The avoidance-zone module 1332 may store avoidance-zone data set by the administrator 1302 and/or an automatic machine learning process, and transmits it to the prediction module 1336 upon request. An avoidance zone may be an arbitrarily defined area such that vehicles never enter it over the traversal of a designated route. In some embodiments, the avoidance zone may be reversed such that it functions as a "preferred zone" wherein it is an arbitrarily defined area such that vehicles are preferably routed to traverse through. The system may also recognize patterns and generate its own avoidance zone. Through the use of an input device, the administrator 1302 may draw a circle or polygon of any shape and any size on a map stored and generated by the mapping module 1314 that may include avoidance areas, such as, e.g., construction zones, natural disaster zones, truck restrictions, areas restricted by internal and external business regulations, and generally dangerous areas for vehicle traversal. Designated time intervals may also be set for each avoidance zone. For example, if a known construction site impedes traffic due to its operations between 8 AM and 10 AM on Mondays and Wednesdays for the next three weeks, then the optimized route will avoid the construction site during those designated time windows.

Avoidance zones can restrict the travel path of all vehicles, or it may be vehicle specific, e.g., a specific car that has bad suspensions does not carry too much weight, and/or vehicle type specific, e.g., a tall cargo truck cannot fit under low laying bridges, and/or driver type specific, e.g., unskilled or uncertified driver can't go into a part of a warehouse. Avoidance zones may also act as travel time coefficients, travel time accelerators, or travel time decelerators. For example, an avoidance zone may be created by administrator 1302 or accessed from a first-party or third-party database to specify that a vehicle comprising specific attributes will travel at a different rate of speed than the maximum posted and permitted speed limits. This capability enables administrators and the self-learning system to adjust road segment speeds to match real-world expertise, real-world knowledge, and real-world data that has been collected over any period of time.

Avoidance-zones can also be defined, stored, managed, and updated in the avoidance-zone database 1334 by a third-party user, administrator, or computer system. For example, if a vehicle was supposed to visit a location on the route and unload at the front of a warehouse, a third-party user administrator at the warehouse facility may specify that the region in front of the warehouse is not accessible because of a temporary road closure, such as, e.g., a construction site, snow accumulation, and etc. As a result, the system may automatically detect and locate the nearest permitted location next to the initially requested location that is outside of the avoidance-zone. In addition, avoidance-zones can be defined and set based on traffic signal schedules and bridge opening and closing schedules. The system and the method may route vehicles to avoid a bridge during times in which it is closed, and/or to avoid a road that is expected to have a red light at the time the vehicle will be present, in order to shorten travel time and reduce operational costs. Alternatively, the route may avoid traffic signals altogether. Data about traffic signal schedules and bridge schedules may be obtained and combined from a first-party tracked database, and/or a crowdsourced databased, and/or third-party databases.

The avoidance-zone module 1332 may also store information about prohibited maneuver types for road segments within that avoidance-zone. Prohibited maneuver-type data that may be accessible in the avoidance-zone module includes: left-turn, right-turn, and U-turn. For example, if a particular intersection of a road segment prohibits drivers from making a left turn, the optimization server 1310 will sequence an optimum route that avoids such maneuver. The avoidance-zone module 1312 may obtain prohibited (and allowed) maneuver data from a third-party source, such as a traffic data vendor, and/or from first-party tracking data. Avoidance-zone attributes and restrictions do not necessarily have to correspond with the restrictions posted on road-segments on the route and can be arbitrarily defined by an administrator because of local area knowledge, or for example, by an automated computer program that detects and suggests the creation of temporary or permanent avoidance-zones to optimize multi-stop routes more effectively.

In addition, prohibited maneuvers may be country-specific, such as due to the reversal of traffic directions. As an example, for countries that drive on the right-hand side of traffic, such as, e.g., the United States and Canada, the optimized route may specify left-turn avoidance zones to avoid collision with traffic in the other direction, while for countries that drive on the left-hand side of traffic, such as, e.g., the United Kingdom and Australia, the optimized route may specify right-turn avoidance zones also to avoid collision with oncoming traffic. U-turns are generally not country specific; however, U-turn avoidance may be implemented in areas that prohibit making a U-turn. When computing the traffic-enabled or non-traffic-enabled time and distance between the destinations that must be visited, the time and distance computation process may incorporate the impact on time and distance that may occur as a result of the maneuver avoidance constraints.

The route sequencing may also take into consideration situations where a one-way road segment alters the direction of traffic, such as, e.g., a country with right-hand side driving direction may comprise a one-way road that requires a driver to make a left turn only at the intersection of the one-way road. In this situation, the optimized route may prohibit the vehicle or a driver of the vehicle from making a right turn. The route sequence may also take into consideration the additional time and distance of a prohibited turn while sequencing the route.

In the event that avoidance-zones, road-segment data, historical or current traffic information have conflicting information, an administrator can specify a bias or priority for a specific data source.

The prediction module 1336 communicates with the optimization server 1310 to predict current and future traffic conditions, and to sequence a route based on real-time and historical data collected from the traffic module 1320, weather module 1324, hazard module 1328, and avoidance-zone module 1332 on the road segments being traveled. For each route identified by the routing module 1312, the prediction module 1336 predicts: travel time, congestion level, hazard information, weather conditions, avoidance zones, and etc. For example, if a route is requested in an area for the day after a major snow or rain event, the present invention will take into consideration anticipated slowdowns that may still be in effect due to post weather event congestion, such as, e.g., due to ice, snow accumulation, lane closures and flooding. The prediction module 1336 may take into account the reduction in traffic speed on the route, depending on the severity of the weather condition. The same route may be sequenced differently when considering time-of-day and time-of-year specific traffic patterns.

In some embodiments, predicting the travel time for a route may comprise the prediction module identifying each segment of the route, calculating the travel time for each segment and summing the calculated travel times of the segments to determine the total travel time for the route. In at least one embodiment, the prediction module calculates travel time using the formula, $T=D/S$, where T is the travel time, D is the travel distance, and S is the average speed at which traffic is currently travelling on the segment. In general, the more segments that the system obtains from a given route, the more accurate the predicted travel time will be. If real-time traffic information is not available for the segment, the prediction module may calculate the travel time for the segment by substituting current speed with a predicted speed. The predicted speed is a prediction of the average speed on the segment. The prediction module 1336 may determine the predicted speed using information received by the traffic module 1320, weather module 1324, the hazard module 1328, and/or avoidance zone module 1332. For example, a predicted speed can be determined if the information includes a vehicle speed, such as, e.g., a recommended speed or a recorded speed. If a predicted speed is not available, the prediction module may use the minimum and maximum posted speed limits on the roadway segment.

In one embodiment, the prediction module 1336 predicts and assigns a congestion level to the route, such as, e.g., a high, a medium, or a low level of congestion. Congestion levels for each segment may be based on real-time and/or historical data obtained from traffic module 1320, weather module 1324, hazard module 1328, and/or avoidance-zone module 1332. In some embodiments, traffic speed is used to determine the congestion level. For a route comprising multiple segments with varying congestion levels, the prediction module 1336 determines the congestion level along each segment of the route and computes the total travel time to travel all the connected road segments taking into account the impact of the traffic slowdown or traffic speed for each road segment in the route being traveled. The administrator 1302 may configure the prediction module 1336 to determine the congestion level by selecting the greater or lesser of the congestion factors along each segment of the route, for example, such that a high level of congestion on a particular road segment may indicate that the likelihood of congestion of the entire route is also high, or vice versa.

The prediction module may assign priority levels to the traffic module 1320, the weather module 1324, the hazard module 1328, and/or the avoidance-zone module 1332 in such a manner that a higher priority level indicates heavier weight and reliance on the information received than compared to a lower priority level. In one embodiment of the invention, the avoidance zone module 1332 may be set at the highest priority, the traffic module 1320 may be set at the second highest priority, the weather module 1324 may be set at the lowest priority, and the hazard module 1328 may be set at the second lowest priority. Additionally, the prediction module 1336 may assign a higher priority level to real-time traffic data when compared with historical traffic data. The system may also assign a higher priority level to first-party tracked data than third-party source data, or the inverse. The priority levels set by the prediction module 1336 may vary, depending on availability of information and current circumstances. The administrator 1302 may also set or override predetermined priority levels for each route. A priority level override permits the administrator 1302 or an automatic computer program to set ad-hoc priority levels without impacting all other routes in the system. However, if none of the traffic module 1320, the weather module 1324, the hazard module 1328, and/or the avoidance-zone module 1332 receive data that can be used to determine the predicted speed of the segment, then the prediction module 1336 may determine that the predicted speed is the normal speed limit of the segment. The prediction module may receive the normal travel time from the mapping module 1314.

An administrator or computer program accessing the optimization server 1310 and prediction module 1336 can configure or specify the method with which to compute the departure time. For example, in an instance when a route has time windows, a vehicle or user may not need to arrive to the next location on the route for some amount of time. The prediction module 1336 can change the behavior of the traffic prediction and time estimation by instructing the vehicle or driver to wait at its current location, and then depart to the next location at a specific time to minimize and avoid traffic congestion along the route. Alternatively, the prediction module 1336 can instruct the vehicle or driver to depart immediately and wait at the next location.

Historical traffic data may be used in substitution for situations when real-time traffic data is not available. This allows the system to be dynamic and to account for the dynamic nature of traffic patterns, while providing the most efficient route given current traffic conditions. As an example, to predict current traffic conditions on a road segment missing real-time traffic data, historic traffic data may be extrapolated for the same day and time in the preceding week. For illustration, if there is an adverse weather condition that is impacting traffic today or during the current week, but is not present in the previous week, the historical data from last week may not be applicable. Thus, an algorithm may find a better match in another day of the week. Historical and real-time information may be obtained from a third-party source, such as, e.g., a traffic information vendor, and/or from a first-party tracking data.

If historical traffic data is also unavailable, the system may combine and extract data from third-party data sources. Traffic data received from third-party data sources can be retrieved in real-time. A database of stored or cached third-party data may be accessed to compensate for missing data. Traffic data can be retrieved from third-parties concurrently, sequentially, serially, or a combination of all three, and the system or the administrator 1302 can determine which traffic data source has greater priority or greater relevance in the geographic area where the route is taking place. Over time, the system may become self-learning, and may incorporate user, vehicle, sensor, and/or driver generated feedback to automatically determine a bias towards a particular third-party data vendor whose traffic data is more accurate for a specific geographic region, and/or a vehicle type and/or a specific driver.

The prediction module 1336 may use information received from sensors and devices communicatively coupled to the platform to predict traffic conditions of a route, and to communicate with the optimization server for sequencing of the route. For example, assume that for a particular road segment, the traffic module does not have real-time traffic information; however, there is an electronic sign on the road stating, "Slippery When Wet—Reduce Speed to 20 MPH". Instead of assuming that traffic is flowing at a normal pace, e.g., 50 MPH, the prediction module 1336 can use the information from the digital message to predict the speed at which vehicles are traveling on the road to estimate the travel time for the road, or to avoid the road completely. Based on the alert message of the present example, the prediction module would predict that vehicles are traveling at approximately 20 MPH.

Based on predicted traffic conditions of each route, the routing module 1312 evaluates and selects multiple routes between each pair of destinations on the list of destinations that have been inputted, and then selects a route that most closely matches the optimization goals of an administrator and/or third-party system—manual and/or automated—making the optimization request. The system may then provide the user with turn-by-turn driving directions to reach the one or more destinations along the route.

In order to properly determine the optimal route sequence, the optimization server 1310 may utilize a multi-dimensional data structure that contains cost information between at least each pair of destinations on the list of inputted destinations. The cost computation must be calculated at the time resolution that is required for a specific optimization problem, while concurrently taking into consideration historical weather, predictive weather, fixed avoidance zones, avoidance maneuvers, dynamic avoidance zones, current traffic, historical traffic, destination availability constraints, and/or other real-world constraints, such as the slowdown or speedup with which a specific type of vehicle or specific driver may travel.

The dynamic computation of variable travel times and variable costs between each pair of inputted destinations is important because the travel time between each pair changes based on the time of day, traffic flow, vehicle or driver heading, and other real-world conditions previously listed. As a simplified example, if there are three destinations—A, B, and C—the dynamically variable travel time and variable costs associated with each pair of destinations will change based on the departure and arrival time at each location. It may take 30 minutes to travel from A to B departing at 9 AM, but it may take 10 minutes to travel from A to B departing at 11:30 AM. It may take 30 minutes to travel from B to C departing at 12 PM, but it may take 15 minutes to travel from B to C departing at 12:15 PM. If the system is asked to optimally sequence route using traffic, and other real-world constraints at a 15 minute resolution, then the optimization and routing module 1312 will inspect, and/or simulate, and/or evaluate every feasible combination departing in 15 minute increments, and for every inputted destination point. Then, the data extracted from the routing module 1312 can be submitted to the optimization server 1310, which may analyze and evaluate the detailed travel times or cost data, and it will return one or more suggested optimally sequenced routes that minimize or maximize the overall travel time. As a practical example, the optimization engine may route a vehicle or driver to avoid a heavily congested bridge in the morning to avoid rush hour traffic heading south, recommend that the vehicle or driver visit a customer that is farther away but in a region that has no traffic or other real-world anticipated slowdowns, and then route the vehicle or driver back to another destination on the route when the traffic congestion and/or traffic coefficient and/or other real-world constraints meet the optimization objectives required by the third-party system or user making the optimization request.

The routing module 1312 and the platform 1316 may work bi-directionally to identify routes to one or more destinations and may continually re-sequence the routes for one or more vehicles at a predetermined time interval or based on new real-time factors in order to meet the optimization sequence goals for which the optimization server 1310 is being asked to optimize, such as, e.g., changing weather conditions, and/or traffic conditions, and/or a new avoidance zone inputted by a first-party user, and/or first-party database, and/or a third-party user, and/or a third-party database or sensor. When a request is received by the optimization server 1310 for a route to one or more destinations, the routing module 1312 may receive from the position detection device of the mobile device 1306 the current geographic locations of all first-party vehicles, devices, and/or users as well as concurrently retrieve or receive information about vehicles, devices, or users from third-party data sources. Based on the current locations and inputted destinations, the routing module 1312 may retrieve a raster map, or vector map, or an underlying road-network graph from the mapping module 1314. The map may be a layer comprising data points, lines, and polygons that represent geographic sites and structures, roads, boundaries, and etc. oriented in geographic space.

The mapping module 1314 may convert coordinates received from the position detection device into graphical depictions on the map. The mapping module 1314 can accept and dynamically convert coordinates from one coordinate system to another. The mapping module 1314 can also represent a closed road-network, for example, roads within a large warehouse or yard. For example, coordinates may be overlaid with a map to show the positions of vehicles and destination points. The mapping module 1314 may communicate with the platform to obtain information and coordinates of real-time, historical and predicted future traffic and weather conditions, existing and new hazards, existing and predicted avoidance zones, custom territory input information, and display the information in a similar manner. The mapping module 1314 may be country-specific in the sense that it may utilize a map that is specific to that geography, or it may show multiple countries and regions in a single view or data response.

The routing module 1312 may also communicate with the prediction module 1336 to analyze all available real-time, historical and/or predicted future traffic information on applicable roadway segments gathered from the traffic module 1320, the weather module 1324, the hazard module 1328, and the avoidance zone module 1332, including data from sensors coupled to the modules, first-party tracking, and/or third-party sources to determine a preferred route. The administrator 1302 may set certain criteria for the requested route, such as, e.g., recommend the route with the shortest predicted travel time, avoid areas with a high likelihood of congestion, and/or avoid areas with a high likelihood of an accident.

The optimization server 1310 may select a collection of routes to recommend to vehicles as the most efficient route to travel between every destination on the route, while staying within the parameters and constraints set by an automated computer generated process or by a human administrator. The optimization server 1310 may then provide the vehicles with turn-by-turn driving directions to reach the one or more destinations along the route, and may present information and metadata about the route and each location on the route, such as, e.g., the mileage of the route, the estimated time of arrival, fuel usage, cost to fulfill the route, the likelihood of congestion, the likelihood of an accident, as well as location specific delays. Driving directions may restrict the user to travel on designated roadways or to avoid machine generated and/or human administrator defined avoidance zones.

In at least one embodiment, the present invention discloses a system and a method to perform filtering of the route deviation data and/or road network data, e.g., outliers may be removed, prior to processing of the data. Both of the route deviation data and the road network data may comprise current or real-time data, and/or historical data. The filtered data may be stored and analyzed to build a persona or driver profile of a driver, in addition to predicting or forecasting traffic-related information. Filtering of the data may provide the benefits of minimizing the system's processing of non-relevant or useless data, and processing only data that is relevant to a particular calculation or determination. Obtained route deviation data and/or road network data may include multiple data samples provided by mobile data sources, e.g., transit vehicles, and road network data may include first-party data and third-party data that may include readings from vehicle- and road-based sensors, e.g., loop sensors embedded in road pavement, or OBD sensor, and data from other sources. The data may be conditioned and analyzed in various manners to facilitate determination of a driver profile and/or traffic characteristics of interest, such as estimated average traffic speed and estimated total volume of vehicles, and to enable such traffic condition determinations to be performed in real-time or near-real-time. For example, the obtained data may be conditioned to detect and/or correct errors in the data, and the data may be filtered in various ways to remove data from consideration if it is inaccurate and/or unrepresentative of actual traffic characteristics of interest, such as data noise, statistical outliers, repetitive data, straight data, and etc.

The system and method may determine whether the received traffic information is referring to roads and/or vehicles belonging to a generated and/or tracked route. A generated route may be a system optimized route suggested for the destinations and time schedule of the route and a tracked route may be a driver tracked route that the driver traversed in substitute for the generated route. There may be a primary generated route and a plurality of alternate generated routes. If the received traffic information is not referring to the roads and/or vehicles of either calculated routes, then the data may be discarded; on the other hand, if the received traffic information is referring to the roads and/or vehicle of either calculated routes, then the data may be further processed. An example of a road that may not be of interest to the system is any road that lies beyond a predetermined radius distance to the calculated roads of a generated route and/or a tracked route, e.g., 10 meters, or any road that is known to the system to be incompatible with the operations of either route, e.g., an entrance with a small ramp may not be suitable for a large delivery truck. An example of a vehicle that may not be of interest to the system is any vehicle that lies beyond the predetermined radius distance to the calculated roads of the generated route and/or the tracked route, or any vehicle engaged in an activity that is not of interest, e.g., idling or parked vehicles.

The received traffic data may include an alpha and/or a numerical header written such that it allows the system to filter out traffic information comprising headers not specified by a user or system administrator. Headers may indicate category of information, e.g., traffic data, weather data, tracked data, and/or comprise parameters associated with the information, and may allow the system to skip or filter information that is irrelevant to the generated route and/or tracked route, or data that it has already processed.

Figure 14:
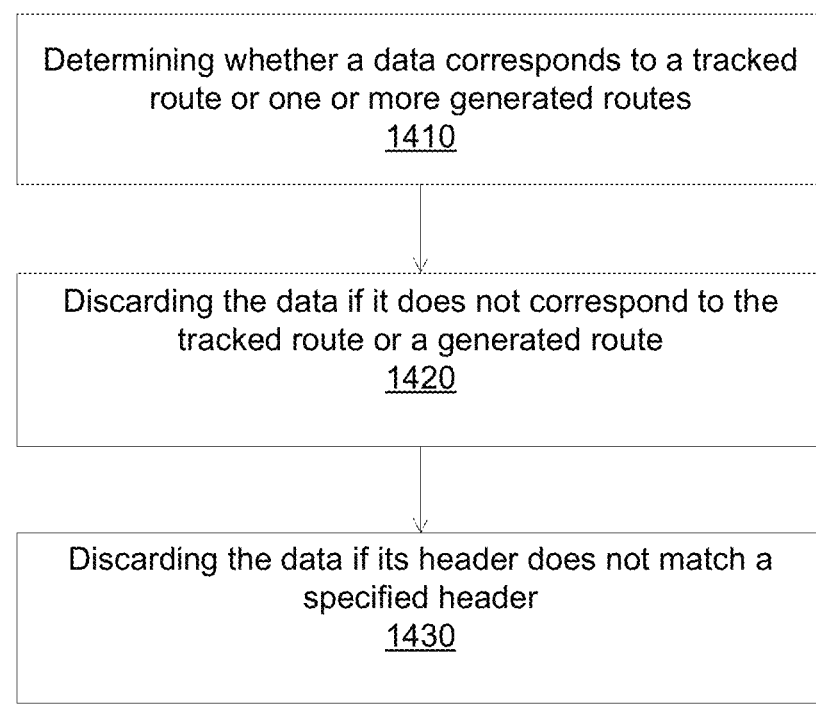
FIG. 14 is a flowchart of a method for filtering route deviation data and road network data, according to at least one embodiment.

FIG. 14 is a flowchart of a method for filtering route deviation data and road network data, according to at least one embodiment. Operation 1410 determines whether a data corresponds to a tracked route or one or more generated routes. The generated routes may comprise a primary route and a plurality of alternate routes. The alternate routes may be prioritized based on total distance, total time, or total cost based on an objective cost function to complete each route. Operation 1420 discards the data if it does not correspond to the tracked route or a generated route. If the received traffic information is referring to the roads and/or vehicle of either calculated routes, then the data may be further processed. Operation 1430 discards the data if its header does not match a specified header. Headers may indicate category of information, e.g., traffic data, weather data, tracked data, and/or comprise parameters associated with the information.

Figure 15:
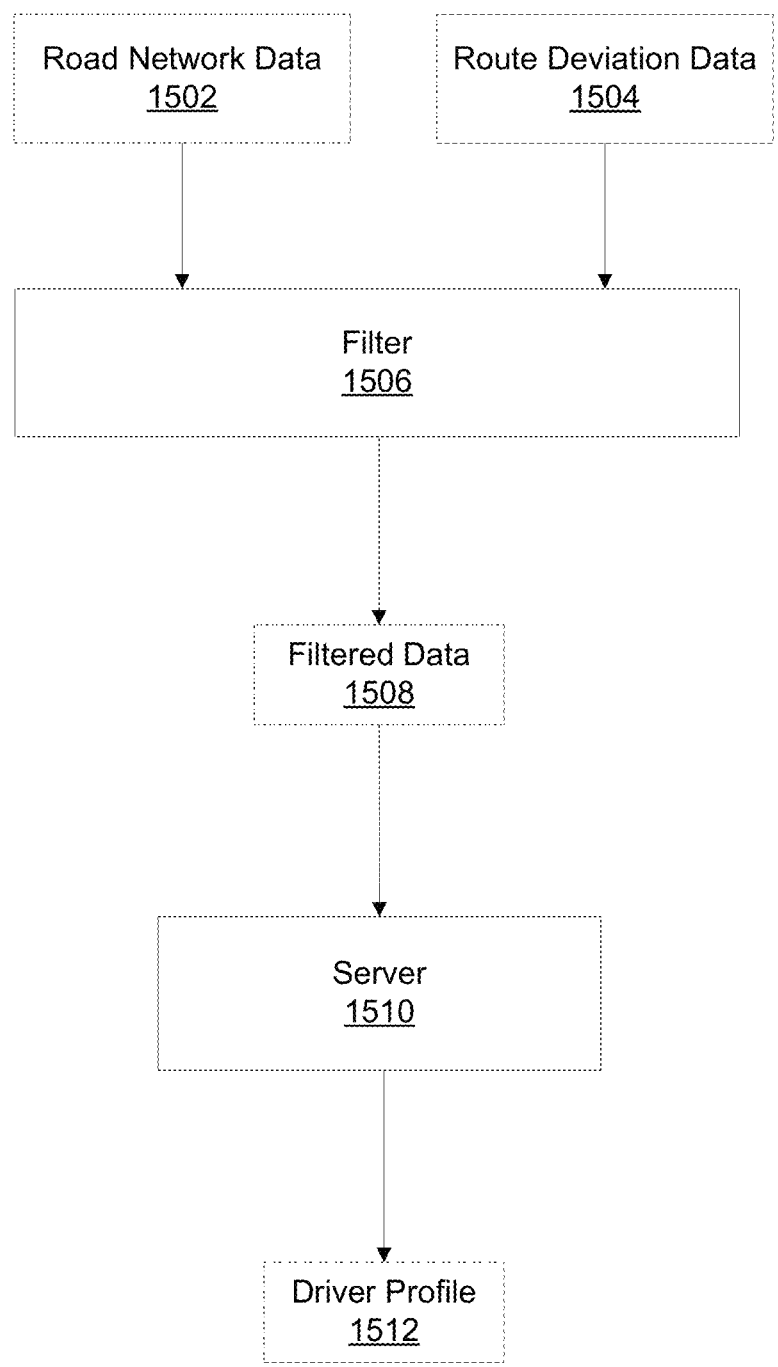
FIG. 15 is a schematic diagram of a data flow that comprises filtering and analyzing the data to build a driver profile, according to at least one embodiment.

FIG. 15 is a schematic diagram of a data flow that comprises filtering and analyzing the data to build a driver profile, according to at least one embodiment. Road network data 1502 and/or route deviation data 1504 may be collected in a network system filter 1506. The data may be filtered in order to increase efficiency of the processing of the data and/or to obtain accurate calculations or determinations. Filtered data 1508 may be processed and analyzed by a server 1510 comprising a memory and a processor to generate a driver profile 1512 and/or traffic-related information.

If the received traffic information is not referring to the roads and/or vehicles of the road network data 1502 and/or the route deviation data 1504, then the data may be discarded; on the other hand, if the received traffic information is referring to the roads and/or vehicle of the road network data 1502 and/or the route deviation data 1504, then the data may be further processed. An example of a road that may not be of interest to the system is any road that lies beyond a predetermined radius distance to the calculated roads of a generated route and/or a tracked route, e.g., 10 meters, or any road that is known to the system to be incompatible with the operations of either route, e.g., an entrance with a small ramp may not be suitable for a large delivery truck. An example of a vehicle that may not be of interest to the system is any vehicle that lies beyond the predetermined radius distance to the calculated roads of a generated route and/or the tracked route, or any vehicle engaged in an activity that is not of interest, e.g., idling or parked vehicles.

In at least one embodiment, the present invention discloses a system and a method to build a persona or profile of a driver of a transit vehicle, according to at least one embodiment. Road network data, e.g., traffic data, combined with tracked route data, e.g., GPS data, may be used to display a graphical indication of one or more system generated routes and a tracked route of a vehicle to determine whether, how, and how much, the vehicle has deviated from a generated route. By comparing a generated route to the tracked route, a driver profile may be built to determine the value of the driver to the fleet or operation. For example, the system and method may analyze historical tracked data of a driver to determine certain tendencies that are specific to the driver. The system may be able to differentiate whether the tracked route, e.g., a deviated route, the driver took was an alternative that provided positive value to the operation and/or fleet of the vehicle, or that it provided negative value to the operation and/or fleet.

The system and method may also predict future driving patterns of a driver based on an analysis of past or historical driving patterns belonging to the driver. A value score may be assigned, such as to indicate to a fleet or operation administrator the driver's effectiveness or worth to the business. Additionally, an acceptable deviation score may be determined and specific to a driver based on the driver's profile. Future optimization of generated routes may be based on the value score and/or acceptable deviation score. For example, a low deviation score may generally indicate that a driver rarely spends time off-road from the generated route and may be desirable; however, a particular driver with deep knowledge of local roads and streets may be allowed a higher deviation score because that driver may understand the road networks better than the system generated route.

In some embodiments, two or more driver profiles may be analyzed and compared. Ultimately, a driver risk management database may be built to determine driver effectiveness and/or ineffectiveness for all drivers of a fleet. For example, a certain driver profile may indicate that the driver is a great driver on clear sunny days; however, the driver may suffer from poor night vision. The system may generate one or more future optimized routes by taking into consideration this data, such as to avoid scheduling the driver during night shifts. Other driver-based parameters that may be compared includes age, geographic region familiarity, and aggressiveness, e.g., idling, speeding, and braking strength.

In addition, certain route parameters may be calculated when comparing a generated route to the tracked route, such as differences in, e.g., mileage, estimated time of arrival (ETA), properties, indices, points, geometry, and other parameters such as, e.g., deviation distance, on-road distance, alternate distance, total distances, planned distances, end points, start points.

Figure 16:
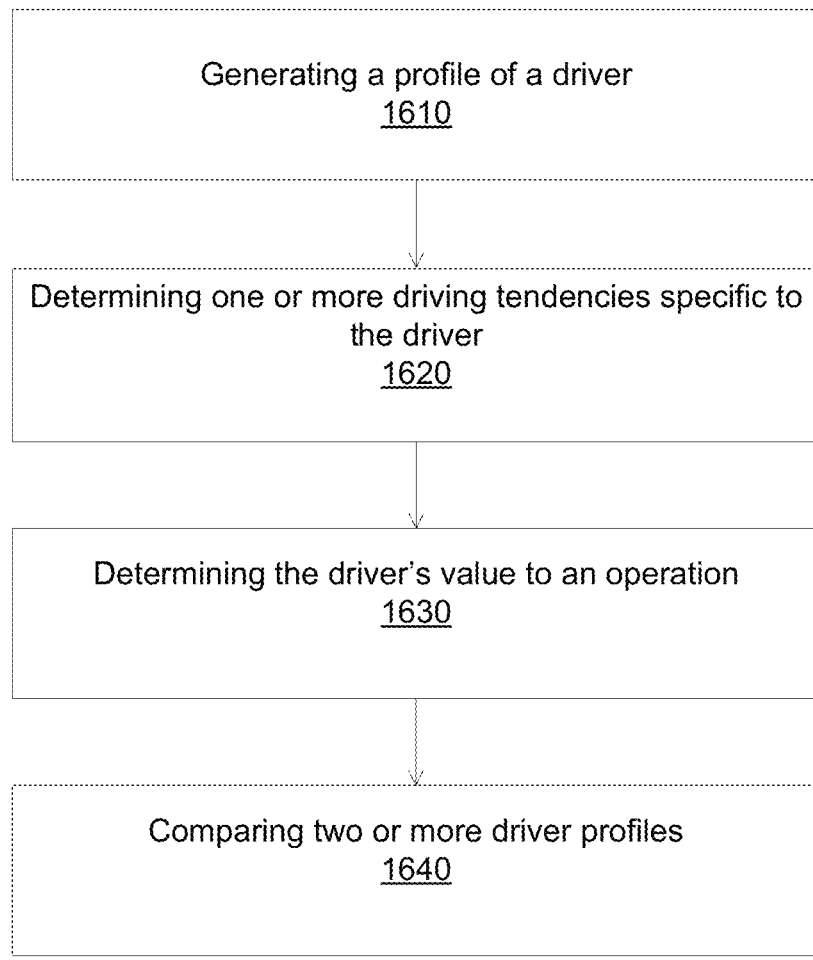
FIG. 16 is a flowchart of a method for generating a driver profile, according to at least one embodiment.

FIG. 16 is a flowchart of a method for generating a driver profile, according to at least embodiment. Operation 1610 generates a profile of a driver based on a tracked route data and a road network data. Operation 1620 determines one or more driving tendencies specific to the driver. Operation 1630 determines the driver's value to an operation of a vehicle fleet. Operation 1640 compares two or more driver profiles based on the driver's value to an operation and/or a driver-based parameter, such as age, geographic region familiarity, and aggressiveness, e.g., idling, speeding, and braking strength.

Figure 17:
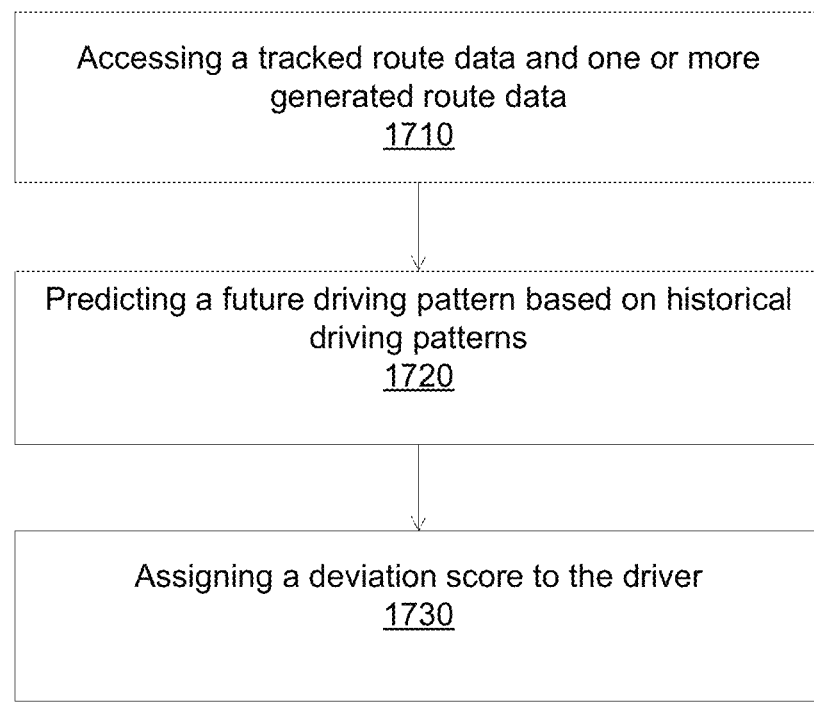
FIG. 17 is a flowchart of a method for predicting a driver's future driving pattern, according to at least one embodiment.

FIG. 17 is a flowchart of a method for predicting a driver's future driving pattern, according to at least one embodiment. Operation 1710 accesses a tracked route data and one or more generated route data. The generated routes may comprise a primary route and a plurality of alternate routes. The alternate routes may be prioritized based on total distance, total time, or total cost based on an objective cost function to complete each route. Operation 1720 predicts a future driving pattern based on an analysis of past or historical driving patterns belonging to the driver. A value score may be assigned, such as to indicate to a fleet or operation administrator the driver's effectiveness or worth to the business. Operation 1730 assigns a deviation score to the driver. Future optimization of generated routes may be based on the value score and/or acceptable deviation score. For example, a low deviation score may generally indicate that a driver rarely spends time off-road from the generated routes and may be desirable; however, a particular driver with deep knowledge of local roads and streets may be allowed a higher deviation score because that driver may understand the road networks better than the system generated routes.

In at least one embodiment, a system and a method for developing a digital signature identifying a specific driver operating a vehicle uses internal and external sensors of a mobile device belonging to the driver. The development of the digital signature and subsequent identification of the driver may be performed by collecting data regarding vehicle operations, analyzing the data to identify at least one pattern of behavior and/or operating characteristic associated with the driver, and developing a digital signature for the driver. Digital signatures for a plurality of drivers may be developed and stored by a storing means, e.g., a memory coupled to a processor, and may be used for comparison of the drivers. In addition, data from the sensors of the mobile device and vehicle-integrated sensors, such as an on-board diagnostic sensor, connected to a network may be combined to provide more accurate calculations and determinations as to the identity of a driver operating a vehicle at any given time interval. Driver identification may be used to allow a system administrator of a vehicle fleet to filter out or filter for specific driver types based on driving behaviors that may be suitable for a particular operation. For example, a driver may be authorized to operate heavy equipment, e.g., large transport trucks, and may comprise a digital signature corresponding to validation to operate the vehicle and is preferred over drivers with an unsuitable digital signature, e.g., erratic drivers.

As another example, the system and method may be able to differentiate between two drivers of a vehicle, such as a primary driver and an alternate driver. The primary driver may be the owner of the vehicle, e.g., based on operation time and/or mileage. The alternate driver may be another driver who operates the vehicle less frequently, e.g., based on operation time and/or mileage, than the primary driver and may comprise different operational constraints, e.g., maximum operation time and/or maximum distance.

One or more internal, e.g., integrated, and/or external, e.g., connected via USB, sensors of a driver's mobile device may communicate with and receive inputs from various vehicle sensors through a processing unit, such as the one described in a previous figure, and may allow for bidirectional communication, such as through a wireless network. According to the present invention, mobile device sensors may comprise a position detection device, a motion sensor, a microphone, a camera, and/or a biometric sensor. The position detection device, e.g., global positioning device (GPS), can be used to track a vehicle or driver, such as monitoring route deviations as described in detail above. Positioning data may also be used to identify a driver based on frequently visited points of interest or commonly used navigation routes.

The motion sensor may comprise an accelerometer, a gyroscope, and/or a magnetometer, and may identify drivers based on habitual driving-motion data. The accelerometer may be any device that measures acceleration, deceleration, yaw, pitch, shock, orientation, vibration, and/or sustained speed. The magnetometer may be an instrument used to measure the magnetization of a magnetic material, e.g., from another vehicle, or to measure the strength and/or direction of a magnetic field. For example, the magnetometer can dynamically detect distances of nearby vehicles to infer the driving behaviors of a driver, such as if the driver has a tendency of tailgating large trucks, or if the driver drives too closely to lane edges, which causes the magnetometer to sense that nearby vehicles are too close to the driver's vehicle.

The microphone may be a device that converts soundwaves into an electrical signal, and in combination with the processing unit, may be used to detect wave patterns and measure sound levels, such as in-vehicle sounds, e.g., driver's speech, and/or out-vehicle sounds, e.g., external ambient noise. The processing unit, such as a sound or speech processing unit, may process the received sound data to analyze wave patterns, such as recognition of a driver's speech patterns and/or ambient sounds belonging to a frequently visited destination of the driver. The data may then be matched with previously recorded and stored soundwaves to identify the driver of a vehicle. Further, the in-vehicle audio data may be analyzed to identify certain types of risky driver behavior, e.g., talking on a phone.

The camera may be used to gather visual data related to driver identification and/or driving behaviors. The gathered data may then be matched with reference images, such as by comparing a facial feature of the driver to previously captured and stored photos of the driver. In addition, visual data of a vehicle's surrounding can be analyzed to determine distances of nearby vehicles and patterns of operation that may aid in the identification of the driver.

The biometric sensor can be any sensor that collects biometric data of a driver of a vehicle, e.g., deoxyribonucleic acid (DNA), finger print, heart rate, and skin conductivity. The biometric data may then be compared to reference biometric data previously collected and stored in the system to determine whether there is a match. In addition, the collected biometric data can be analyzed to determine patterns of biological responses, such as an increased heart rate, to driving activities, such as while changing lanes, which can also help identify the driver of the vehicle.

Collected data from the one or more mobile sensors and/or vehicle sensors may be processed and analyzed to determine driving behavioral patterns. A driving behavioral pattern may comprise a sequence of incidents or events that can be quantified in terms of frequency over time and/or by unique attributes or characteristics for each event of a plurality of events that may be averaged to determine the mean attribute or characteristic for that particular driver for that event type. Once the driving behavioral signature is determined for the driver, the system may compare the signature against any other stored signatures to determine whether there is a positive match. For example, if a driving behavioral category or event type is breaking style, then the number of break application events that occurs over a predetermined time interval, the measured force applied to the breaks during each event, and/or the timing of break applications when traveling up or down slope or while turning, may generate a specific driving behavioral signature. If the driving behavior signature of a particular driver matches with a previously stored driving behavioral signature, then a positive identification of the driver may result.

Figure 18:
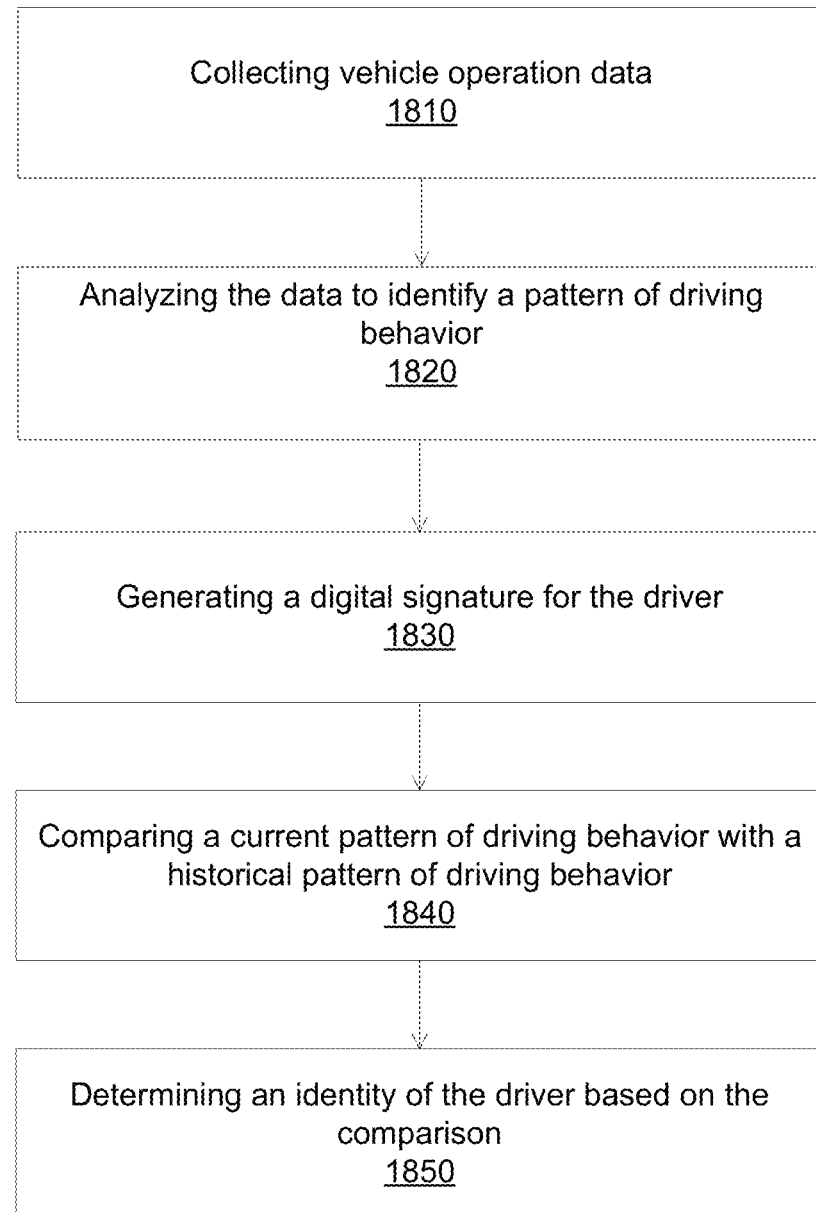
FIG. 18 is a flowchart of a method for determining an identity of a driver based on a pattern of driving behavior, according to at least one embodiment.

FIG. 18 is a flowchart of a method for determining an identity of a driver based on a pattern of driving behavior, according to at least one embodiment. Operation 1810 collects vehicle operation data. Operation 1820 analyzes the data to identify a pattern of driving behavior. Operation 1830 generates a digital signature for the driver based on the pattern of driving behavior. Operation 1840 compares a current pattern of driving behavior with a historical pattern of behavior. Operation 1850 determines an identity of the driver based on the comparison. A positive match may indicate that the driver is identified with a minimum level of confidence that may depend on how closely the pattern of driving behavior matches.

FIG. 19 is a flowchart of a method for filtering drivers for an operation of a vehicle fleet, according to at least one embodiment. Operation 1910 differentiates a plurality of drivers based on a characteristic match for an operation. Operation 1920 filters for a driver based on the characteristic match, and compatibility, with the operation.

Figure 20:
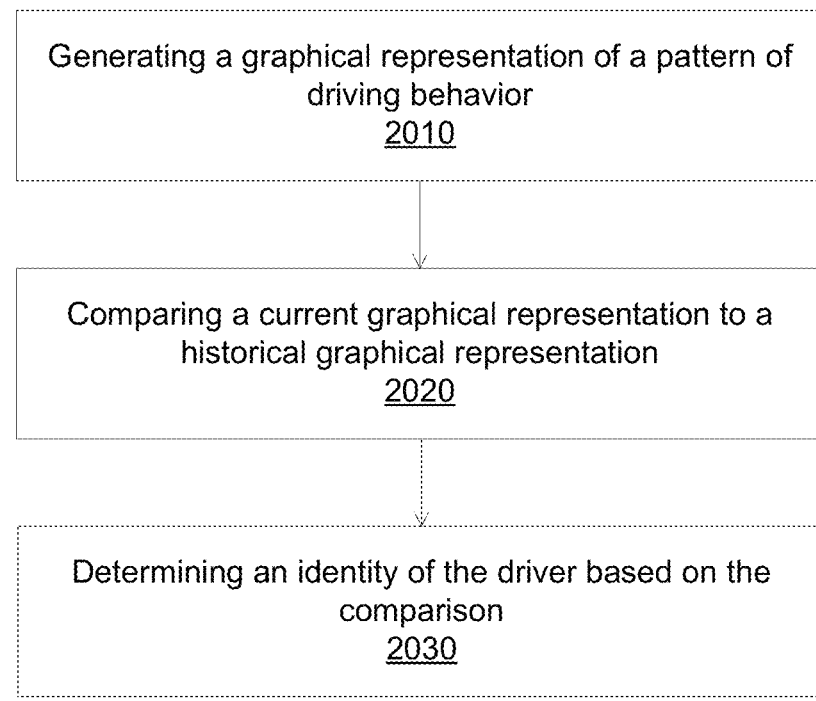
FIG. 20 is a flowchart of a method for determining an identity of a driver based on a graphical representation of a pattern of driving behavior, according to at least one embodiment.

FIG. 20 is a flowchart of a method for determining an identity of a driver based on a graphical representation of a pattern of driving behavior, according to at least one embodiment. Operation 2010 generates a graphical representation of a pattern of driving behavior of a driver. Data may be collected at predetermined frequency and time intervals. Operation 2020 compares a current graphical representation to a historical graphical representation of the pattern of driving behavior. Operation 2030 determines an identity of the driver based on the comparison. A positive match may indicate that the driver is identified with a minimum level of confidence that may depend on how closely the graphical representations match.

In at least one embodiment, the collected data from the one or more mobile sensors and/or vehicle sensors may be obtained, processed and analyzed at specified time and/or distance, e.g., mileage, intervals in order to identify the driver of a vehicle. For example, speed data may be refreshed at every 60 milliseconds traveled to build a graphical representation of a speed pattern to determine how a particular driver accelerates or decelerates when traversing certain road types, e.g., straight and flat roads, or roads with increasing or decreasing elevations. The graphical representation may be associated with the driving behavioral signature of the driver, and may be compared with previously recorded and stored graphical representations to determine whether there is a positive match. The positive match may indicate that the driver is identified with a minimum level of confidence that may depend on how closely the graphical representations match.

In at least one embodiment, the present invention discloses a system and a method for capturing an image of a vehicle's surrounding to verify the vehicle's location based on the image. A geography image may be captured and authenticated by a data processing system to confirm the location of a driver or vehicle that has deviated from one or more generated routes, or to confirm that the driver or vehicle is maintaining paths of the generated routes. One or more cameras may be mounted within the interior of the vehicle, e.g., dashboard, and/or may be mounted on the exterior of the vehicle, e.g., hood or body. In some embodiments, the camera may be configured to move along one or more linear guides. The movement of the camera may allow wider scanning of a visual field of a particular area of interest.

The scanning of the particular area of interest may produce a digital image of the particular area of interest. The light received, e.g. luminance, may be converted into electrical signals which may be processed by the system of the present invention. The devices can capture visual information of their vehicle's surrounding, which can be analyzed to identify the geography of the surrounding. The produced image may be inputted into an algorithm to identify the geography and to compare with a model data of the geography to determine whether there is a match. The model data of a geographic location, natural and/or man-made landscapes may comprise digital information about the geographic location, natural and/or man-made landscapes, and can be generated and stored in the cloud, enabling the model to be synchronized across various network devices, such as a camera or mobile device of a user or vehicle. The model may be first-party captured data or may be provided through a third-party service, e.g., Google™ Street View.

The method of the present invention may include preprocessing or filtering of the captured image, video data and/or model data, such as to improve quality of the captured image. The filtered captured image may be fed into an identification process to analyze the image to locate any known or familiar landmarks or features of the geography that may be helpful in its identification. The relative locations of the landmarks or features may be compared to a library or set of geography locations in order to attempt to match the captured image with the stored landmarks or features. Various pattern or point matching algorithms can be used for such processes as known in the art. If a relative point distribution, or other such data set, matches the information for the model data of the geography with at least a minimum level of confidence, then there may be a positive identification and confirmation of the vehicle's location. For example, a pattern matching algorithm can look for a contour or shape that matches the contour or shape of the model data. If additional image information is needed, such as when the system is unable to determine with a minimum level of confidence, a request to capture additional images may be generated. Multiple sequential images over a predetermined time interval and/or a video capture may help determine if the captured surrounding environment is a physical environment or a photograph of the environment by detecting natural motions and movements of the surrounding environment, e.g., tree branches being blown in the wind. The captured image may also be verified by comparing with road network data, such as if the captured image includes rain or snow, and which if confirmed with a measured weather data, then the captured image may be further verified that it was taken in a determined location, and/or that it was taken of a the physical environment and not a photograph of the environment. Ultimately, the confirmation of the vehicle's location can verify whether the vehicle has deviated from the system generated route.

Alternatively or in addition to the camera, other devices may also be used to capture various other types of image information, such as 3D imaging, infrared image information, thermal imaging data, or other such information which can assist in identifying and verifying a physical surrounding of a transit vehicle. Some embodiments, two or more of these approaches can be combined to improve an accuracy of calculations.

For example, 3D imaging may be captured and analyzed through the use of a stereoscopic lens camera. A stereo camera may any type of camera with two or more lenses with a separate image sensor or film frame for each lens, which may allow the camera to simulate human binocular vision, and therefore gives it the ability to capture 3D images. By generating 3D mapping information, a determination can be made as to whether the camera is capturing image information of a three-dimensional physical space, or a two-dimensional photograph or video display. For example, the image information from stereo images can be compared without the requirement to generate a three-dimensional map or set of disparity information, as the captured image would have a slightly different position between each camera, otherwise a set of the same images would be indicative of a photograph instead of a physical environment.

Additionally, an ultrasonic detection system and/or a laser detection system may be used for object detection, range finding, level sensing, and etc. The system may include an ultrasonic transducer that may be coupled to an ultrasonic transmitter and receiver unit, which is capable of transmitting, as well receiving an ultrasonic beam. An ultrasonic transmitter and receiver unit may be used to transmit an electrical AC pulse at ultrasonic frequencies (15-100 KHz). This electrical pulse may cause the transducer to vibrate and thereby transmit a pulse of ultrasonic energy toward the object to be detected. When this pulse reaches the object, the pulse may be reflected back to the transmitter and receiver unit. The time difference between the transmitted and received pulse may be used to calculate the range of the object of the physical environment.

The ultrasonic detection system may include vibration absorbing damping systems in their mounting to prevent such direct transmission of ultrasonic energy. The system may also include a radiator for controlling the dispersion of the ultrasonic beam. For example, horn structures may be used to direct the path of the ultrasonic energy into a specific, defined direction. An encapsulating member may surround the ultrasonic transducer for damping ultrasonic energy transmitted by the transducer in all but on direction.

Figure 21A:
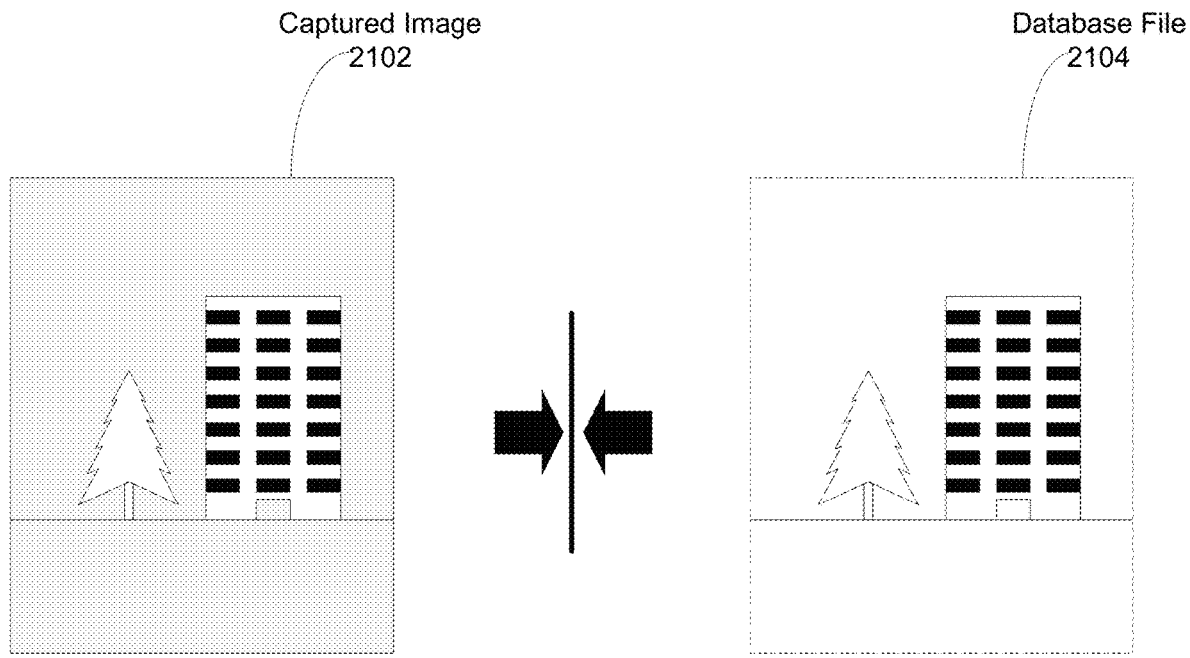
FIGS. 21A-B show methods of comparing a captured image to a model data, or database file, to verify a location and position of a transit vehicle, according to at least one embodiment.
Figure 21B:
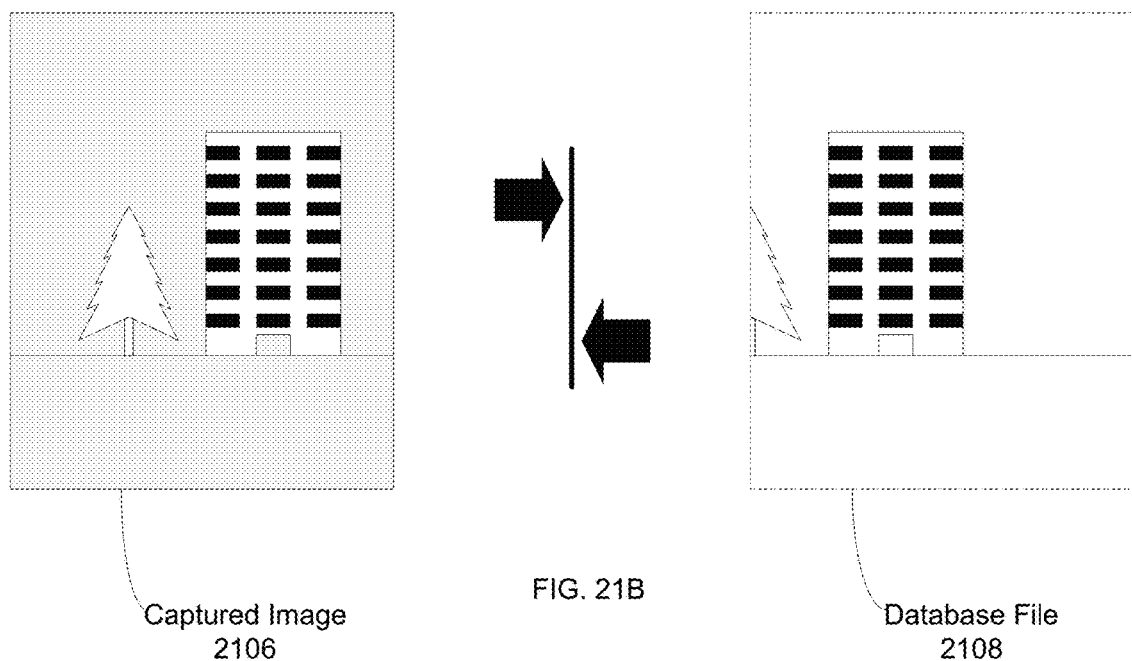

FIGS. 21A-21B show methods of comparing a captured image to a model data, or database file, to verify a location and position of a transit vehicle, according to at least one embodiment. FIG. 21A shows a pattern straight match of captured image 2102 and database file 2104. A straight match may be an identical match, wherein the positions and dimensions of the objects within the images align. The alignment may be based on a minimum level of confidence that corresponds directly a calculated percentage of the pattern match.

In FIG. 21B shows a pattern offset match of the captured image 2106 and the database file 2108. In some embodiments, the system and the method of the present invention may be able to positively identify a location or position of a transit vehicle if there is an offset match between captured image and the database file. An offset match may be a pattern match that is shifted in either a horizontal direction, a vertical direction, or a diagonal direction, but otherwise match in shape and contour of the objects of the images that are present in the files being compared. A level of confidence of the offset match may indicate how likely it is a positive geographical match between the captured image and the database file, and may be dependent on the degree or size of the shift. In general, a smaller shift may yield a higher level of confidence, and a larger shift may yield of lower level of confidence.

Figure 22A:
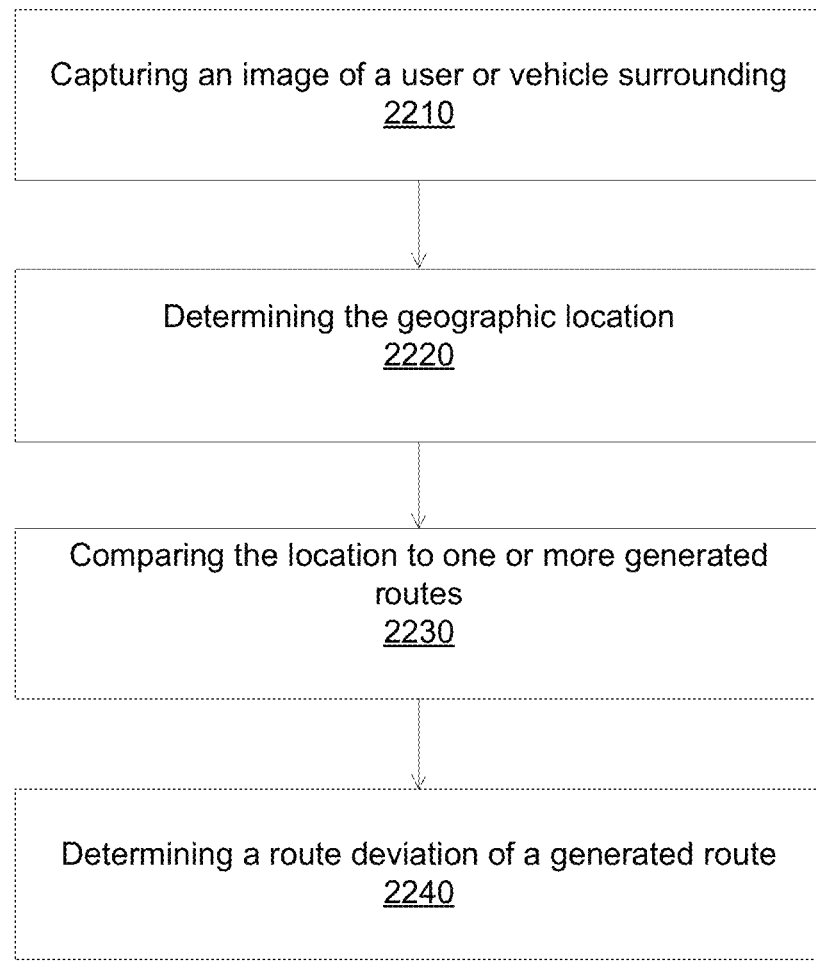
FIG. 22A is a flowchart of a method for detecting a route deviation using a captured image, according to at least one embodiment.

FIG. 22A is a flowchart of a method for detecting a route deviation using a captured image, according to at least one embodiment. Operation 2210 captures an image of a user or vehicle surrounding. Operation 2220 determines the geographic location of the surrounding. Operation 2230 compares the location to one or more generated routes. The generated routes may comprise a primary route and a plurality of alternate routes. The alternate routes may be prioritized based on total distance, total time, or total cost based on an objective cost function to complete each route. The captured image may be inputted into an algorithm to identify the geography, and hence location, by comparing it with a model data geography. Operation 2240 determines a route deviation of a generated route. A pattern matching algorithm can look for a contour or shape that matches the contour or shape of the model data. The filtered captured image may be fed into an identification process to analyze the image to locate any known or familiar landmarks or features of the geography that may be helpful in its identification. The relative locations of the landmarks or features may be compared to a library or set of geography locations in order to attempt to match the captured image with the stored landmarks or features.

Figure 22B:
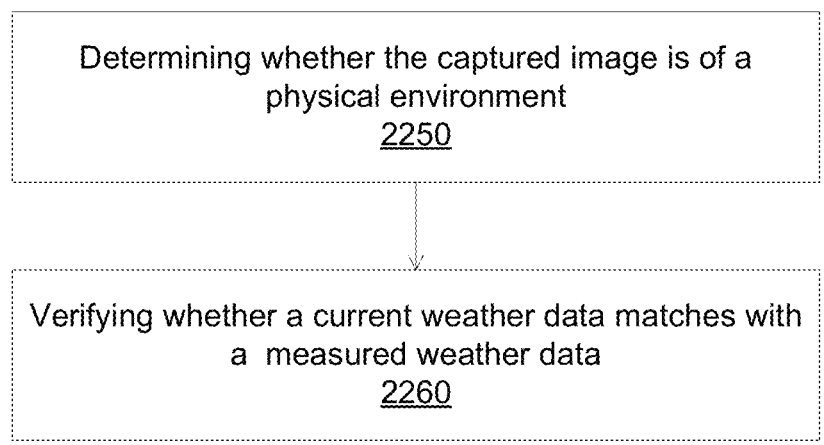
FIG. 22B is a flowchart of a method for quality control of detecting a route deviation using a captured image.

FIG. 22B is a flowchart of a method for quality control of detecting a route deviation using a captured image. Operation 2250 determines whether the captured image is of a physical environment. In one embodiment, this may be accomplished by capturing multiple sequential images (or a playback video) over a predetermined time interval and frequency. A physical environment may be confirmed if the sequential images comprise minor positional changes as would be expected of the detection of natural motions and movements of the surrounding environment, and as the user or vehicle is traversing a roadway; a set of the same images would be indicative of a photograph instead of a physical environment. In another embodiment, a three-dimensional camera may be used to capture the physical environment, and if the resultant image is shown in three-dimensions such that the images comprise angle changes, then a confirmation of a physical environment may be accessed. On the other hand, if the image is not in three-dimensions, then a conclusion may be made that the captured image is of a photograph or playback video. Operation 2260 verifies whether a current weather data of the captured image matches with a measured weather data, such as from a road network data. For example, if the captured image includes rain or snow, and which if confirmed with the measured weather data, then the captured image may be verified that it was taken in a determined location.

Figure 23:
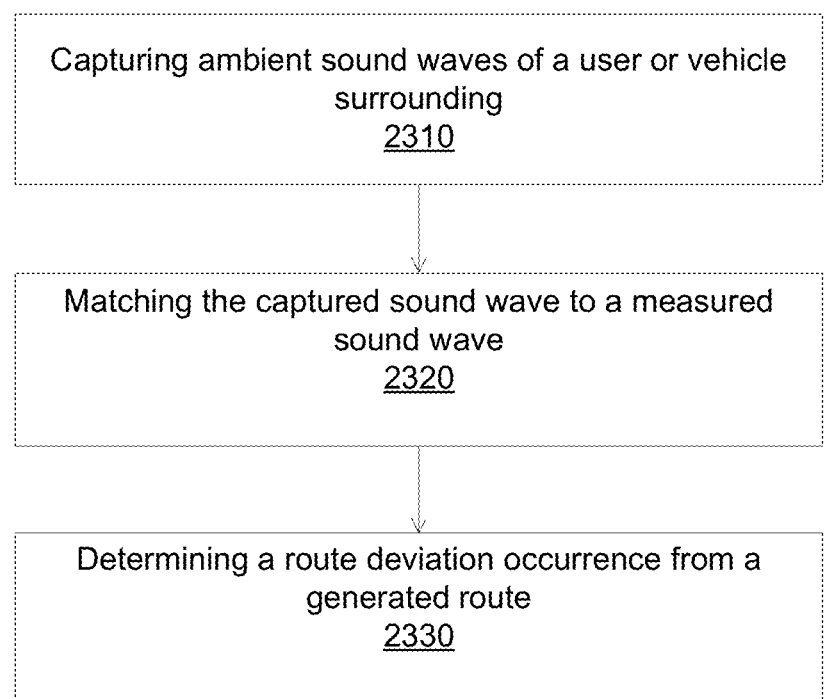
FIG. 23 is a flowchart of a method for detecting a route deviation using an audio sound wave, according to at least one embodiment.

FIG. 23 is a flowchart of a method for detecting a route deviation using an audio sound wave, according to at least one embodiment. Operation 2310 captures ambient sound waves of a user or vehicle surrounding. Operation 2320 matches the captured sound wave to a measured sound wave of a generated route. Recognized portions may be compared with previously recorded and stored soundwaves in search of a positive match. Various pattern or point matching algorithms can be used for such processes as known in the art. Operation 2330 determines a route deviation occurrence from one or more generated routes. The generated routes may comprise a primary route and a plurality of alternate routes. The alternate routes may be prioritized based on total distance, total time, or total cost based on an objective cost function to complete each route. If a relative point distribution, or other such data set, matches the information for the model data of the soundwaves with at least a minimum level of confidence, then there may be a positive identification and confirmation of the user or vehicle location.

In at least one embodiment, the present invention discloses a system and a method for collecting ambient soundwaves of a vehicle's surrounding to verify the vehicle's location based on the soundwaves. Ambient sounds such as from birds chirping, wind blowing, human vocal chattering, and leaves and branches swinging, may be captured and authenticated by a data processing system to confirm the location of a driver or vehicle that has deviated from one or more generated routes, or to confirm that the driver or vehicle is maintaining paths of the generated routes. One or more microphones of a mobile device belonging to the driver and/or of the vehicle may be used to capture the soundwaves. The microphone may be a device that converts soundwaves into an electrical signal, and may be used to detect wave patterns and measure sound levels of an environment of the driver's vehicle. A sound or speech processing unit may process the received sound data to analyze the wave patterns, such as recognition of a driver's speech patterns and/or ambient sounds belonging to a frequently visited destination of the driver. The data may then be matched with previously recorded and stored soundwaves to determine or confirm whether the driver has deviated from a system generated route.

The method of the present invention may include pre-processing or filtering of the collected audio data, such as to improve quality of the captured soundwaves. The filtered soundwaves may be fed into an identification process to analyze for known or familiar soundwave portions that may be helpful in its identification. Recognized portions may be compared with previously recorded and stored soundwaves in search of a positive match. Various pattern or point matching algorithms can be used for such processes as known in the art. If a relative point distribution, or other such data set, matches the information for the model data of the soundwaves with at least a minimum level of confidence, then there may be a positive identification and confirmation of the vehicle's location.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium, and/or may be performed in any order. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:
1. A machine-implemented method, comprising:
geocoding coordinates of at least one of a user, a vehicle, and a destination on a map;
tracking positioning data of the user, the vehicle, and the destination on the map to generate a tracked route;
generating a pair of buffer perimeters surrounding a generated route;
comparing the tracked route to the pair of buffer perimeters;
determining a route deviation occurrence based on the comparison of the vehicle's location to the pair of buffer perimeters,
wherein the pair of buffer perimeters encloses both sides of the generated route,
wherein route deviation occurs if the vehicle's location is disposed beyond a buffer perimeter's width,
wherein generating a pair of buffer perimeters comprises overlaying one or more buffer zones on top of a generated route;
positioning the buffer zones' widths perpendicular to a direction of a road segment of the generated route;
overlapping two or more buffer zones to indicate a change in direction of the generated route; and
calculating an overlap angle between a pair of overlapping adjacent buffer zones to determine a degree of change in direction of the generated route.

2. The method of claim 1, further comprising:
wherein a degree of the overlap angle is directly proportional to a degree of change in direction of a generated route.

3. A data processing system, comprising:
a processor; and
a memory coupled to the processor, the memory storing instructions which when executed by the processor causes the processor to perform a method, comprising:
geocoding coordinates of at least one of a user, a vehicle, and a destination on a map;
tracking positioning data of the user, the vehicle, and the destination on the map to generate a tracked route,
wherein the tracking of the positioning data is performed at a predetermined time interval;
comparing the tracked route to one or more generated routes,
wherein the generated routes are prioritized based on at least one of a total distance, a total time, and an objective cost function,
wherein a plurality of buffer zones divide a generated route into multiple segments;
detecting a deviation of the tracked route from a generated route;
resequencing a generated route; and
increasing a buffer zone frequency to increase an accuracy of a resultant pair of buffer perimeters to a generated route; or
decreasing a buffer zone length to increase an accuracy of a resultant pair of buffer perimeter to a generated route.

4. A data processing system, comprising:
a processor; and
a memory coupled to the processor, the memory storing instructions which when executed by the processor causes the processor to perform a method, comprising:
geocoding coordinates of at least one of a user, a vehicle, and a destination on a map;
tracking positioning data of the user, the vehicle, and the destination on the map to generate a tracked route,
wherein the tracking of the positioning data is performed at a predetermined time interval;
comparing the tracked route to one or more generated routes,
wherein the generated routes are prioritized based on at least one of a total distance, a total time, and an objective cost function,
wherein a plurality of buffer zones divides a generated route into multiple segments;
detecting a deviation of the tracked route from a generated route;
resequencing a generated route,
wherein the tracked route and the generated route comprise an offset,
wherein the offset is a match of spatial patterns of the tracked route and the generated route that lie outside of a corresponding pair of buffer perimeters, and
wherein the offset does not correspond to a deviation occurrence.

5. The method of claim 4, further comprising:
wherein the offset corresponds to at least one of a data error, a map shift and a presence of a plurality of routes of a geographic location.

* * * * *